(12) United States Patent
Sankaran et al.

(10) Patent No.: US 10,938,591 B2
(45) Date of Patent: Mar. 2, 2021

(54) MULTICAST SYSTEM

(71) Applicant: Dell Products L.P., Round Rock, TX (US)

(72) Inventors: Ganesh Chennimalai Sankaran, TamilNadu (IN); Balaji Venkat Venkataswami, TamilNadu (IN)

(73) Assignee: Dell Products L.P., Round Rock, TX (US)

( * ) Notice: Subject to any disclaimer, the term of this patent is extended or adjusted under 35 U.S.C. 154(b) by 322 days.

(21) Appl. No.: 16/052,757

(22) Filed: Aug. 2, 2018

(65) Prior Publication Data

US 2020/0044880 A1 Feb. 6, 2020

(51) Int. Cl.
*H04L 12/18* (2006.01)
*H04L 12/24* (2006.01)

(52) U.S. Cl.
CPC ............ *H04L 12/189* (2013.01); *H04L 41/08* (2013.01)

(58) Field of Classification Search
CPC ............ H04L 41/0816; H04L 43/0829; H04L 12/189; H04L 12/185; H04L 41/08
See application file for complete search history.

(56) References Cited

U.S. PATENT DOCUMENTS

| | | | |
|---|---|---|---|
| 2003/0217135 A1* | 11/2003 | Chatani | H04L 67/1051 709/223 |
| 2005/0076099 A1* | 4/2005 | Wang | H04L 67/28 709/219 |
| 2010/0103932 A1* | 4/2010 | Kako | H04L 47/10 370/389 |
| 2010/0223492 A1* | 9/2010 | Farrugia | H04L 65/1006 714/4.1 |
| 2011/0055912 A1* | 3/2011 | Fusari | G06F 16/972 726/8 |

* cited by examiner

*Primary Examiner* — Mandish K Randhawa
(74) *Attorney, Agent, or Firm* — Haynes and Boone, LLP

(57) ABSTRACT

A multicast system includes a networking device. A server subsystem is coupled to the networking device. A source device is coupled to the networking device and is configured to generate a data stream, and transmit the data stream as a unicast communication that is directed through the networking device to the server subsystem. A receiver device is coupled to the networking device and is configured to transmit a request to join the data stream. A management subsystem is coupled to the networking device and is configured to receive the request that was transmitted by the receiver device. Based on the request, the management subsystem configures the networking device to replicate the data steam received as the unicast communication that is directed to the server subsystem to provide a replicated data stream, and transmit the replicated data stream as a unicast communication that is directed to the receiver device.

17 Claims, 21 Drawing Sheets

MULTICAST SYSTEM

BACKGROUND

The present disclosure relates generally to information handling systems, and more particularly to multicasting data using information handling systems while reducing the amount of state information maintained by those information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, router devices and/or other networking devices known in the art, are sometimes used for multicasting data. For example, router devices in a network often utilize Protocol Independent Multicasting (PIM) for multicasting data streams through a network. In a specific example of a multicast network, a source device will be connected to a First-Hop Router (FHR) device that is further connected to a Rendezvous Point (RP) router device via transit router device(s). The RP router device is further connected to one or more Last-Hop Router (LHR) devices via transit router device(s), with the LHR devices connected to any number of destination devices. In such a multicast network, a multicast data stream sent from the source device to the destination device(s) is handled by the FHR device, transit router device(s), RP router device, and LHR devices, and the handling of such multicast data streams raises some issues.

For example, in such multicast networks that utilize PIM, the router devices between the source device and the destination device(s) may include state machines, and may operate to perform changes on their state machines based on multicast data received in the multicast data stream (e.g., a first packet in a multicast data stream may complete an Input InterFace (IIF) part of the state, etc.), which one of skill in the art will recognize does not provide a "clean" or "clear" separation of the data plane and the control plane in the multicast network. As such, the multicast state in the multicast network is omnipresent, with all intermediate router devices between the source device and the destination device(s) maintaining the multicast state, and using timers to check the liveliness of the associated data stream. Furthermore, router devices in multicast networks that utilize PIM must open up and switch between multiple multicast trees (e.g., a (*, G) RP tree, an (S, G) Shortest Path (SP) tree, etc.)

Further still, such multicast networks have no precise administrative controls, no network-wide view of resource consumption (e.g., bandwidth taken up by the multicast data stream(s)), no ability to control distribution of multicast data stream(s) (e.g., controlling a maximum number of destination devices that may receive the data stream), no ability to control admission of users/destination devices to the multicast data stream, and/or may lack other control capabilities that would be apparent to one of skill in the art in possession of the present disclosure. As such, conventional multicast techniques such as PIM require complexity in each of the router devices of the network that handle a multicast data stream with regard to maintaining the multicast state, and are limited in control capabilities.

Accordingly, it would be desirable to provide an improved multicast system.

SUMMARY

According to one embodiment, an Information Handling System (IHS), comprising a processing system; and a memory system that is coupled to the processing system and that includes instructions that, when executed by the processing system, cause the processing system to provide a management engine that is configured to: receive a request that was transmitted by a receiver device that is coupled to a networking device, wherein the request identifies a data stream that is generated by a source device and transmitted as a unicast communication that is directed through the networking device to a server subsystem; and configure the networking device to: replicate the data steam received as the unicast communication that is directed to the server subsystem to provide a replicated data stream; and transmit the replicated data stream as a unicast communication that is directed to the receiver device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
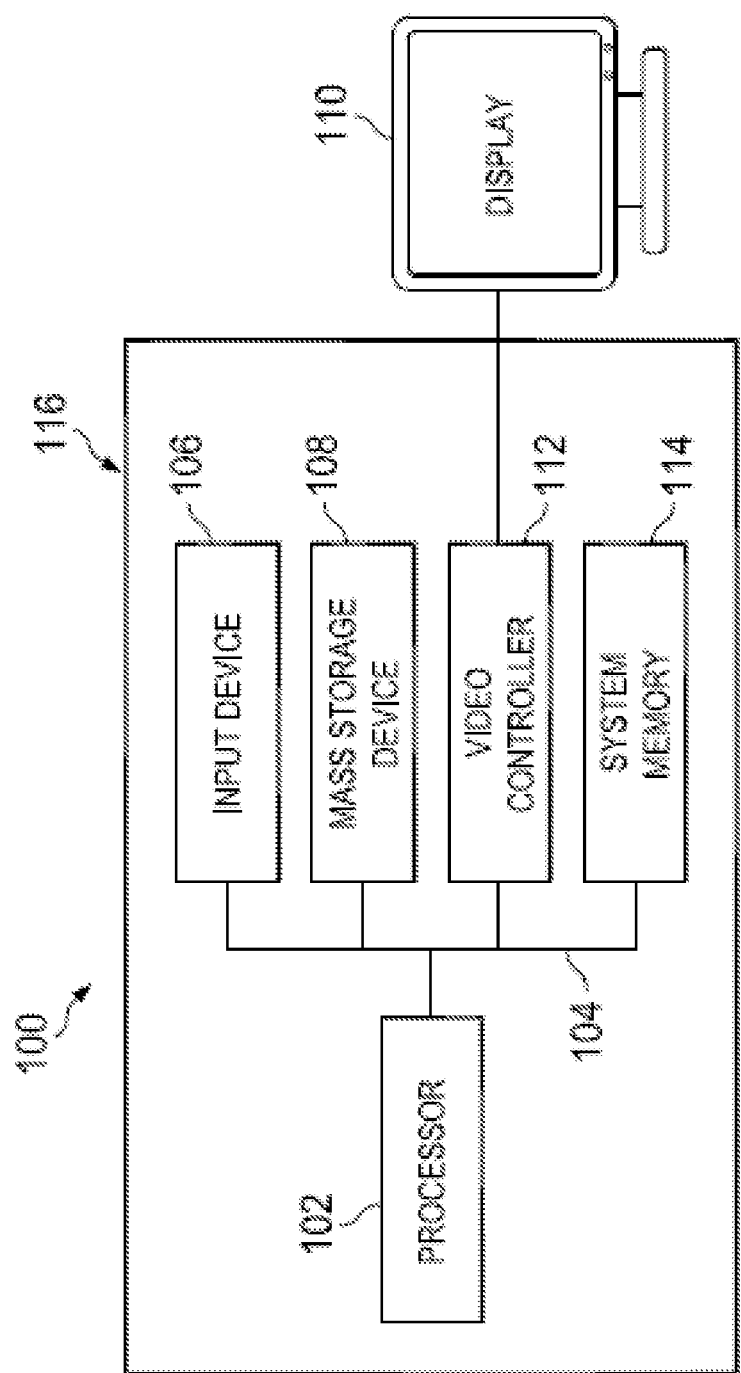
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
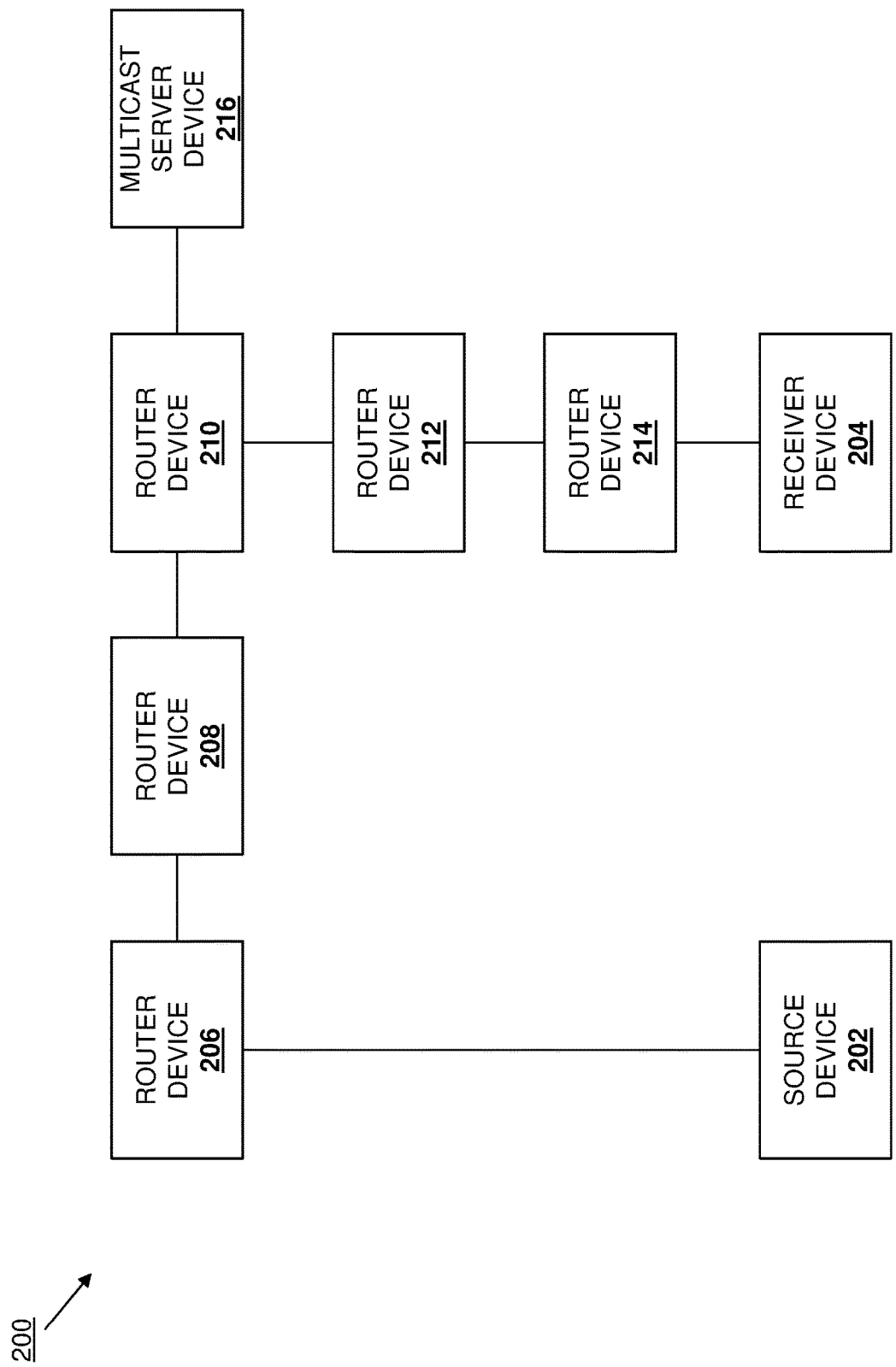
FIG. 2A is a schematic view illustrating an embodiment of a multicast system.
Figure 2B:
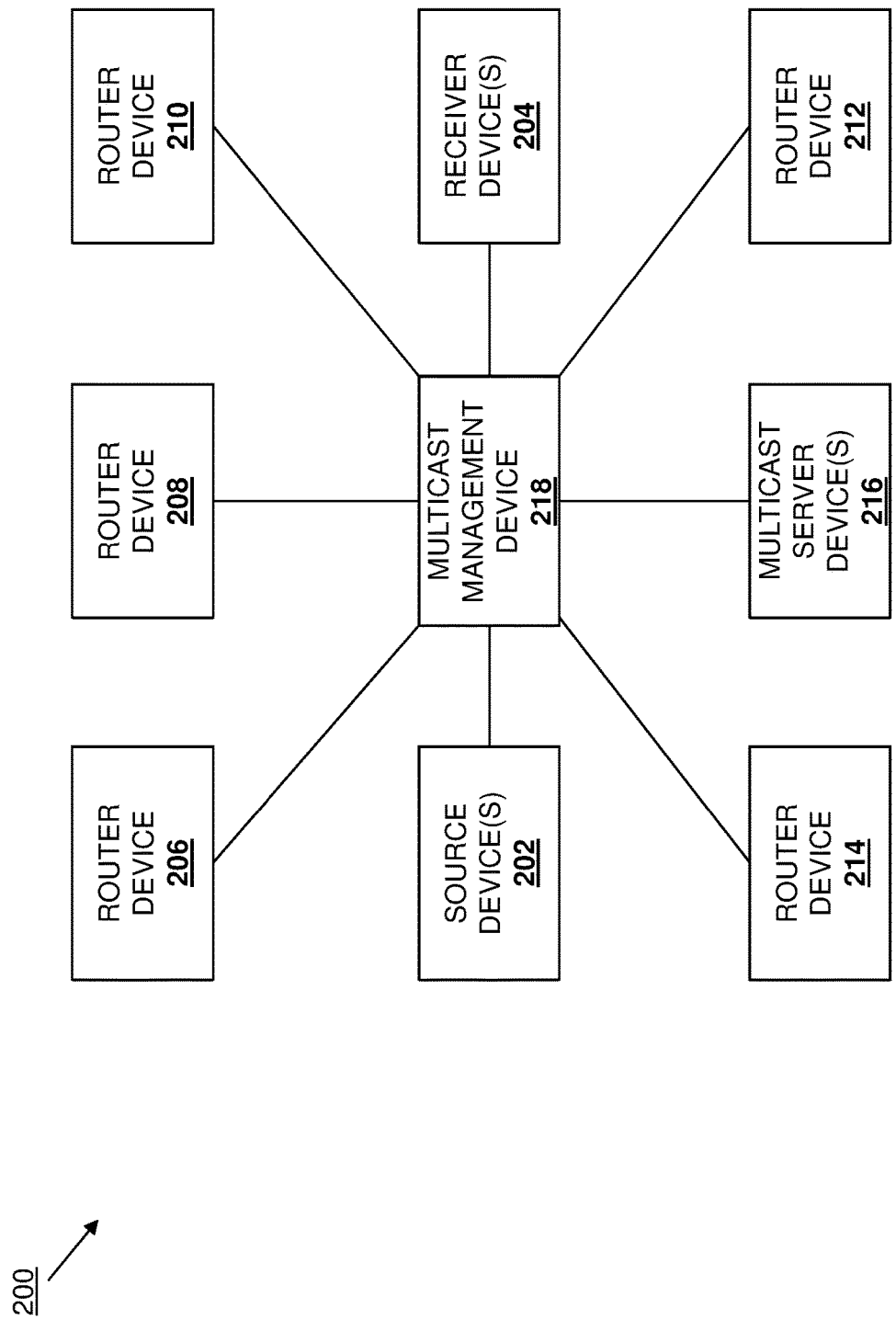
FIG. 2B is a schematic view illustrating an embodiment of the multicast system of FIG. 2A.

Referring now to FIGS. 2A and 2B, an embodiment of a multicast system 200 is illustrated. In the illustrated embodiment, the multicast system 200 may include any number of source devices 202 that are coupled to any number of receiver devices 204 by a plurality of router devices 206, 208, 210, 212, and 214. For example, the source device(s) 202 may be provided by the IHS 100 discussed above with reference to FIG. 1 and/or may include some or all of the components of the IHS 100 and, in a specific example, may be provided by the data stream server device discussed below that is configured to provide data streams (e.g., audio data streams, video data streams, and/or other data streams that would be apparent to one of skill in the art in possession of the present disclosure) through the multicast system 200. However, one of skill in the art in possession of the present disclosure will recognize that other types of source devices will benefit from the teachings of the present disclosure and thus will fall within its scope as well. Furthermore, the receiver device(s) 204 may be provided by the IHS 100 discussed above with reference to FIG. 1 and/or may include some or all of the components of the IHS 100 and, in a specific example, may be provided by the client device (e.g., a desktop computing device, a laptop/notebook computing device, a tablet computing device, a mobile phone, etc.) discussed below that is configured to request and receive data streams through the multicast system 200. However, one of skill in the art in possession of the present disclosure will recognize that other types of receiver devices will benefit from the teachings of the present disclosure and thus will fall within its scope as well.

Further still, any or all of the router devices 204-214 may be provided by the IHS 100 discussed above with reference to FIG. 1 and/or may include some or all of the components of the IHS 100 and, in a specific example, are provided by router device discussed below that may be configured as discussed below to enable the multicasting of the present disclosure. However, one of skill in the art in possession of the present disclosure will recognize that other types of networking devices (switch devices, etc.) may benefit from the teachings of the present disclosure and thus will fall within its scope as well. In the examples discussed below, any number of multicast server device(s) 216 may be coupled to router devices (e.g., the router device 210 in the examples below) and may be provided by the IHS 100 discussed above with reference to FIG. 1 and/or may include some or all of the components of the IHS 100, although one of skill in the art in possession of the present disclosure will recognize that the multicast system 200 may include additional multicast server devices and/or multicast server device(s) coupled to router devices other than the router device 210 while remaining within the scope of the present disclosure.

As illustrated in FIG. 2B, and in the examples discussed below, a multicast management device 218 may be coupled to any of the source device(s) 202, the receiver device(s) 204, the router devices 206-214, and/or the multicast server device(s) 216, and may be provided by the IHS 100 discussed above with reference to FIG. 1 and/or may include some or all of the components of the IHS 100. For example, one of skill in the art in possession of the present disclosure will recognize that FIG. 2A may provide a representation of a data plane in the multicast system 200, FIG. 2B may provide a representation of a management plane in the multicast system 200, and either or both of FIGS. 2A and 2B may provide a representation of a control plane (e.g., provided via the multicast server device 216 in FIG. 2A and/or the multicast management device 218 in FIG. 2B), although other multicast system configurations will fall within the scope of the present disclosure as well. Furthermore, while the multicast server device 216 and the multicast management device 218 are illustrated and described below as separate devices, (e.g., in separate device chassis), in some embodiments, the server subsystem that performs the functionality of the multicast server device 216 discussed below, and the management subsystem that provides the functionality of the multicast management device 218 discussed below, may be provided by the same device (e.g., that is coupled to the router device(s) 206-214) and/or provided in the same device chassis. While a specific multicast system 200 is illustrated and described herein, one of skill in the art in possession of the present disclosure will recognize that multicast systems according to the teachings of the present disclosure may include a variety of different devices and/or device configurations that will fall within the scope of the present disclosure as well.

Figure 3:
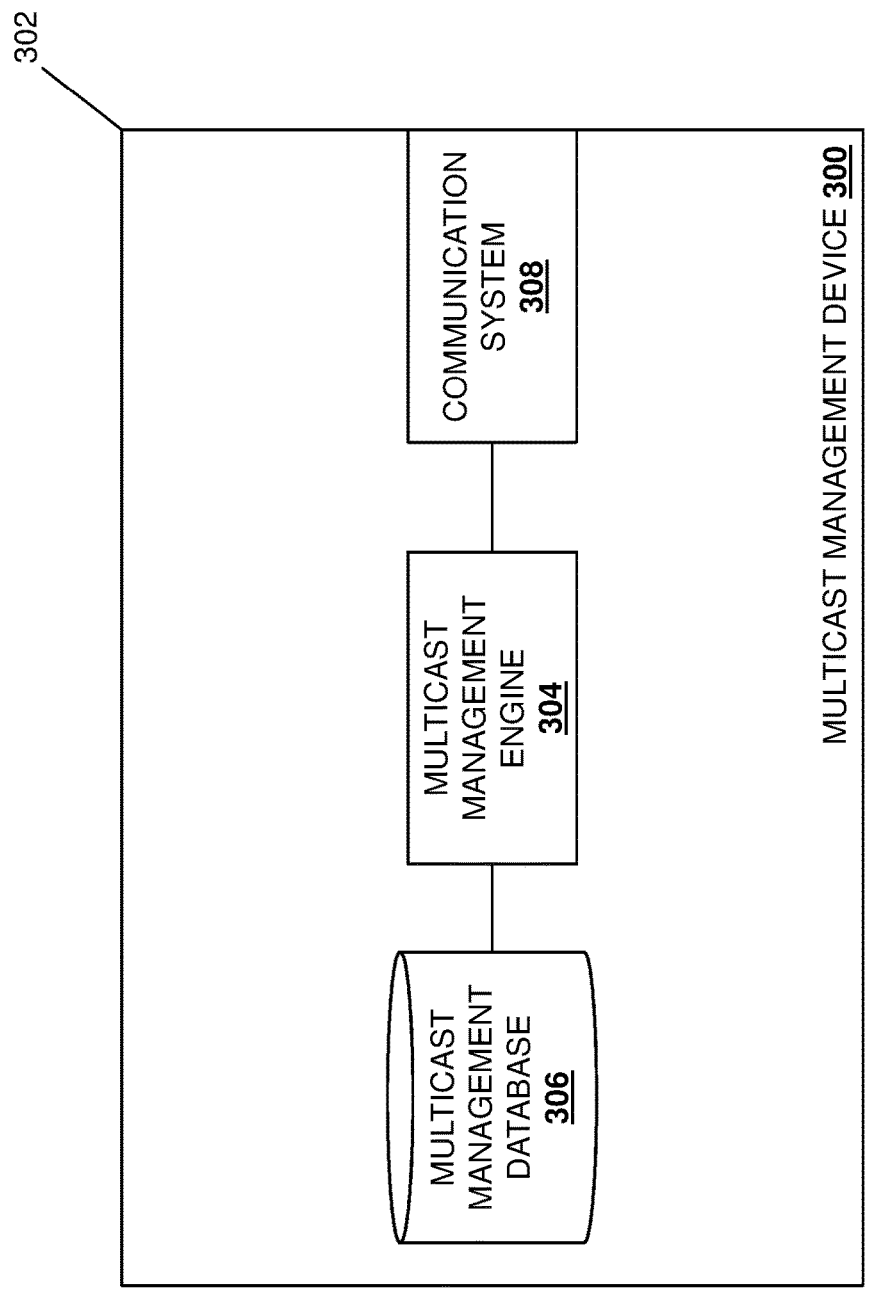
FIG. 3 is a schematic view illustrating an embodiment of a multicast management device used in the multicast system of FIG. 2B.

Referring now to FIG. 3, an embodiment of a multicast management device 300 is illustrated that may provide the multicast management device 218 discussed above with reference to FIG. 2B. As such, the multicast management device 300 may be provided by the IHS 100 and/or include some or all of the components of the IHS 100, and in some examples may be combined with the multicast server device 400 discussed below such that the functionality of both is provided by a single device and/or in the same device chassis. In the illustrated embodiment, the multicast management device 300 includes a chassis 302 that houses the components of the multicast management device 300, only some of which are illustrated in FIG. 3. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a multicast management engine 304 that is configured to perform the functionality of the multicast management engines and multicast management devices discussed below.

The chassis 302 may also house a storage device (not illustrated, but which may include the storage device 108 discussed above with reference to FIG. 1) that is coupled to the multicast management engine 304 (e.g., via a coupling between the storage device and the processing system) and that includes a multicast management database 306 that is configured to store any of the data utilized by the multicast management engine 304 as discussed below. The chassis 302 may also house a communication system 308 that is coupled to the multicast management engine 304 (e.g., via a coupling between the communication system 308 and the processing system) and that may include a Network Interface Controller (NIC), wireless communication subsystems (e.g., BLUETOOTH®, Near Field Communication (NFC), Wifi, etc.), and/or a variety of other communication components that would be apparent to one of skill in the art for providing the couplings between the multicast management device 218/300 and the other devices in the multicast system 200 discussed above. While a specific multicast management device 300 has been illustrated and described, one of skill in the art in possession of the present disclosure will recognize that multicast management devices may include a variety of components and/or component configurations for providing conventional management device functionality, as well as the functionality described below, while remaining within the scope of the present disclosure.

Figure 4:
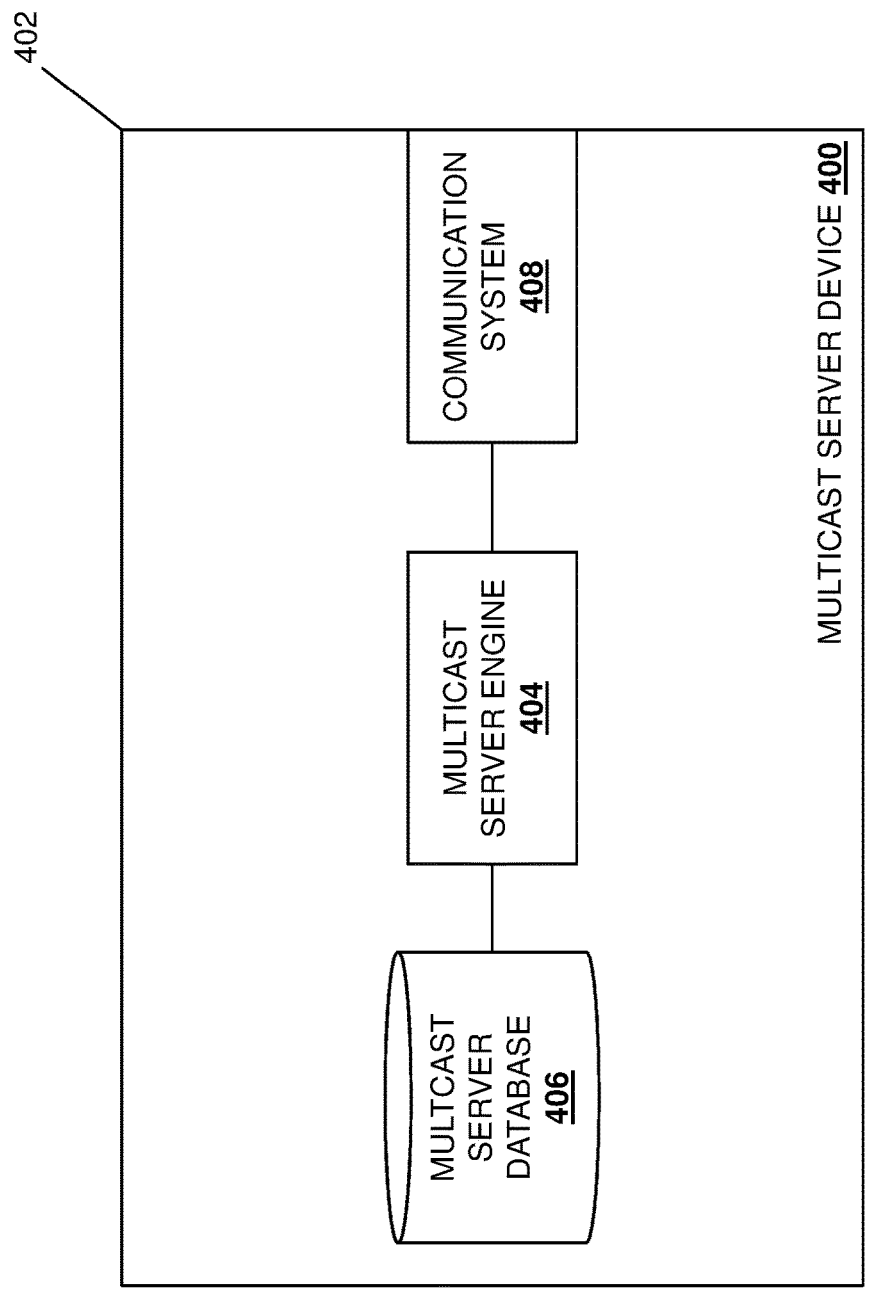
FIG. 4 is a schematic view illustrating an embodiment of a multicast server device used in the multicast system of FIGS. 2A and 2B.

Referring now to FIG. 4, an embodiment of a multicast server device 400 is illustrated that may provide any of the multicast server device(s) 216 discussed above with reference to FIGS. 2A and 2B. As such, the multicast server device 400 may be provided by the IHS 100 and/or include some or all of the components of the IHS 100, and in some examples may be combined with the multicast management device 300 discussed below such that the functionality of both is provided by a single device and/or in the same device chassis. In the illustrated embodiment, the multicast server device 400 includes a chassis 402 that houses the components of the multicast server device 400, only some of which are illustrated in FIG. 4. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a multicast server engine 404 that is configured to perform the functionality of the multicast server engines and multicast server devices discussed below.

The chassis 402 may also house a storage device (not illustrated, but which may include the storage device 108 discussed above with reference to FIG. 1) that is coupled to the multicast server engine 404 (e.g., via a coupling between the storage device and the processing system) and that includes a multicast server database 406 that is configured to store any of the data utilized by the multicast server engine 404 as discussed below. The chassis 402 may also house a communication system 408 that is coupled to the multicast server engine 404 (e.g., via a coupling between the communication system 408 and the processing system) and that may include a Network Interface Controller (NIC), wireless communication subsystems (e.g., BLUETOOTH®, Near Field Communication (NFC), Wifi, etc.), and/or a variety of other communication components that would be apparent to one of skill in the art for providing the couplings between the multicast server device 216/400 and any of the router devices in the multicast system 200 discussed above. While a specific multicast server device 400 has been illustrated and described, one of skill in the art in possession of the present disclosure will recognize that multicast server devices may include a variety of components and/or component configurations for providing conventional server device functionality, as well as the functionality described below, while remaining within the scope of the present disclosure.

Figure 5:
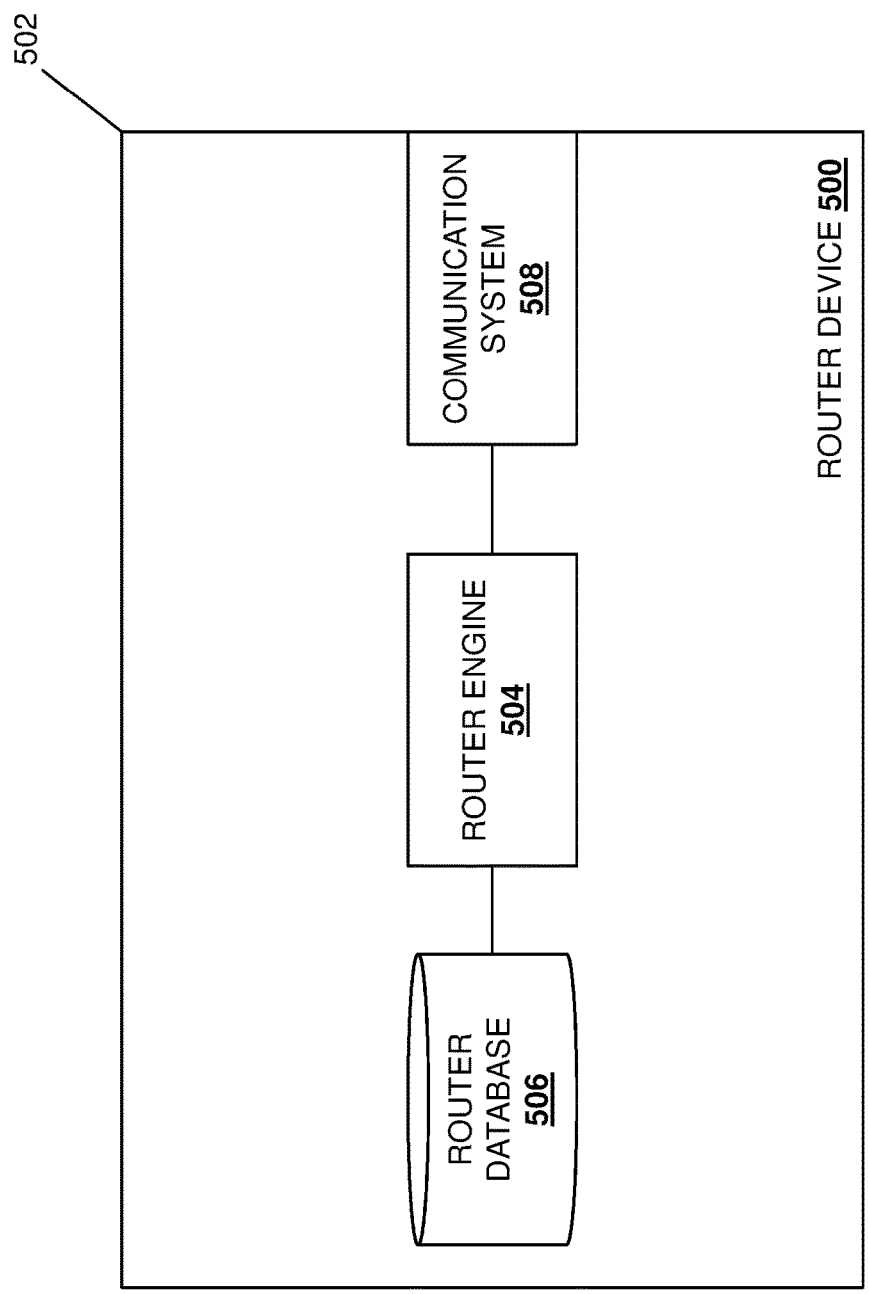
FIG. 5 is a schematic view illustrating an embodiment of a router device used in the multicast system of FIGS. 2A and 2B.

Referring now to FIG. 5, an embodiment of a router device 500 is illustrated that may provide any or all of the router devices 206-214 discussed above with reference to FIGS. 2A and 2B. As such, the router device 500 may be provided by the IHS 100 and/or include some or all of the components of the IHS 100, and in specific examples may be provided by router devices, switch devices, and/or other networking devices that would be apparent to one of skill in the art in possession of the present disclosure. In the illustrated embodiment, the router device 500 includes a chassis 502 that houses the components of the router device 500, only some of which are illustrated in FIG. 5. For example, the chassis 502 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a router engine 504 that is configured to perform the functionality of the router engines and router devices discussed below.

The chassis 502 may also house a storage device (not illustrated, but which may include the storage device 108 discussed above with reference to FIG. 1) that is coupled to the router engine 504 (e.g., via a coupling between the storage device and the processing system) and that includes a router database 506 that is configured to store any of the data utilized by the router engine 504 as discussed below. The chassis 502 may also house a communication system 508 that is coupled to the router engine 504 (e.g., via a coupling between the communication system 508 and the processing system) and that may include a Network Interface Controller (NIC), wireless communication subsystems (e.g., BLUETOOTH®, Near Field Communication (NFC), Wifi, etc.), and/or a variety of other communication components that would be apparent to one of skill in the art for providing the couplings between the router device 400 and any of the other devices in the multicast system 200 discussed above. While a specific router device 500 has been illustrated and described, one of skill in the art in possession of the present disclosure will recognize that router devices may include a variety of components and/or component configurations for providing conventional router device functionality, as well as the functionality described below, while remaining within the scope of the present disclosure. Furthermore, one of skill in the art in possession of the present disclosure will recognize that, in some embodiments, the router devices of the present disclosure may be conventional router devices that may be configured as discussed below to enable the novel and non-obvious multicast functionality of the present disclosure.

Figure 6:
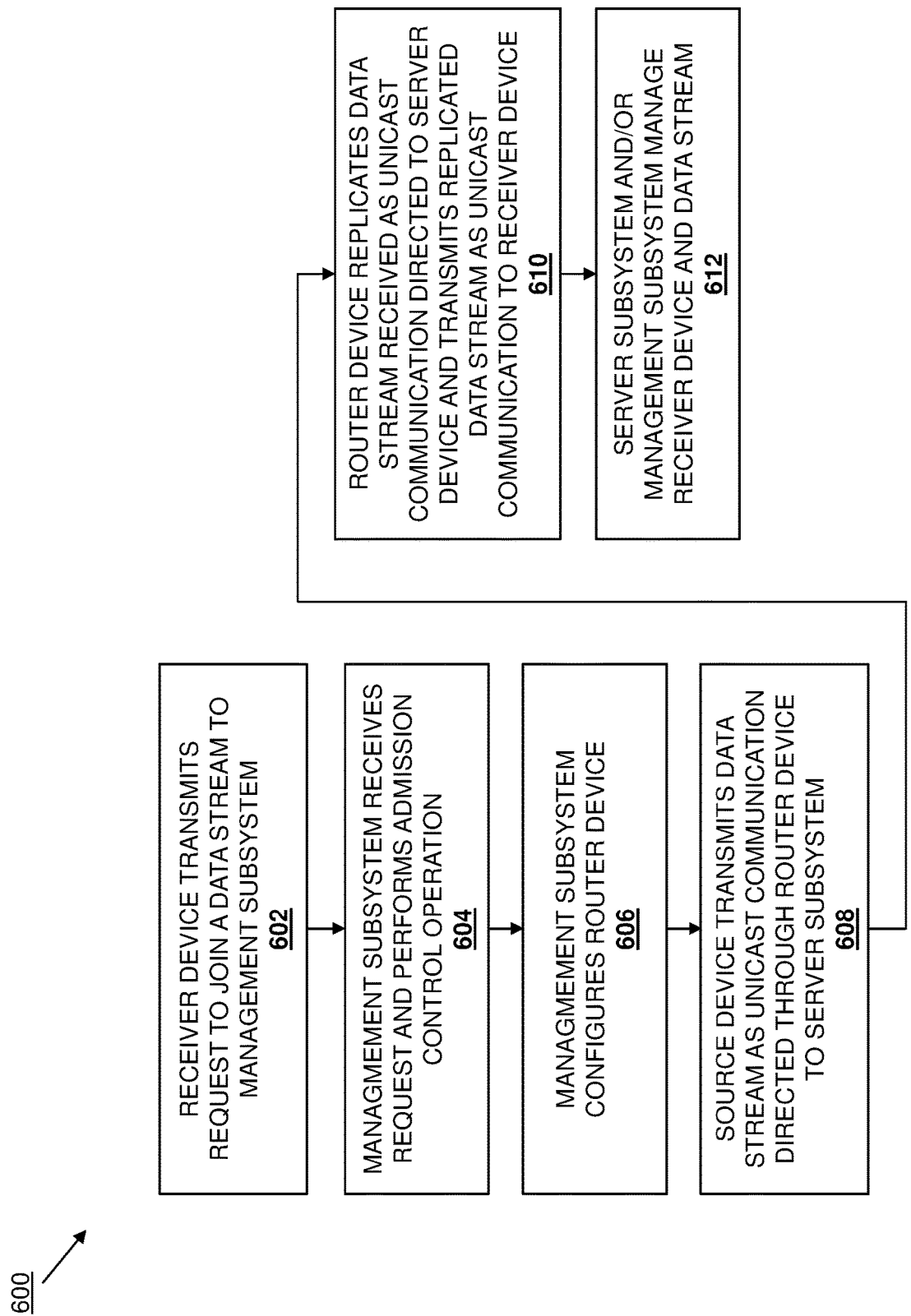
FIG. 6 is a flow chart illustrating an embodiment of a method for multicasting.

Referring now to FIG. 6, an embodiment of a method 600 of multicasting is illustrated. As discussed below, the systems and methods of the present disclosure provide for the multicasting of data streams via a plurality of router devices in a manner that substantially reduces the amount of state information that must be maintained by those router devices. In an embodiment, such multicasting may be accomplished using a management subsystem that receives a request, which is transmitted by a receiver device that is coupled to a router device, and which identifies a data stream that is generated by a source device and transmitted by the source device as a unicast communication that is directed through the router device to a server subsystem. In response to receiving that request, the management subsystem may configure the router device to replicate the data steam (which is received as the unicast communication that is directed to the server subsystem) to provide a replicated data stream, and transmit the replicated data stream as a unicast communication that is directed to the receiver device. The configuration of the router device by management subsystem may enable the router device to change the source of the replicated data stream from the source device (i.e., the source address of the source device in the data stream that was sent by the source device) to the server device, and change the destination of the replicated data stream from the server device (i.e., the destination address of the server device in the data stream that was sent by the source device) to the receiver device. As discussed below, the multicasting of the present disclosure is enabled with unicast data streams, a control/management plane that provides for admission control, the configuration of "split point" router device and data stream layer 3 (L3) packet header rewrites, a data plane with data stream packet loss reconciliation, and/or other features discussed below.

The method 600 begins at block 602 where a receiver device transmits a request to join a data stream to a management subsystem. In an embodiment, at or prior to block 602, the source device 202 may generate, provide, and/or otherwise enable a data stream that may include, for example, an audio data stream (e.g., a voice call, a song stream, etc.), a video data stream (e.g., a video call, a television program or movie stream, etc.), and/or other data streams that would be apparent to one of skill in the art in possession of the present disclosure. As discussed herein, the data stream generated, provided, and/or otherwise enabled by the source device 202 is transmitted as a unicast communication that is directed to the multicast server device 216. In some embodiments, that multicast server device 216 may be the only multicast server device 216 in the multicast system 200, while in other embodiments, that multicast server device 216 may be selected (e.g., by the multicast management device 218) from a plurality of multicast server devices in the multicast system 200 based on, for example, multicast server load balancing criteria, likely receiver device proximity, and/or any other considerations that would be apparent to one of skill in the art in possession of the present disclosure. The generation, provisioning, and/or other enabling of a data stream is known in the art and, as such, is not explained in detail here.

Figure 7A:
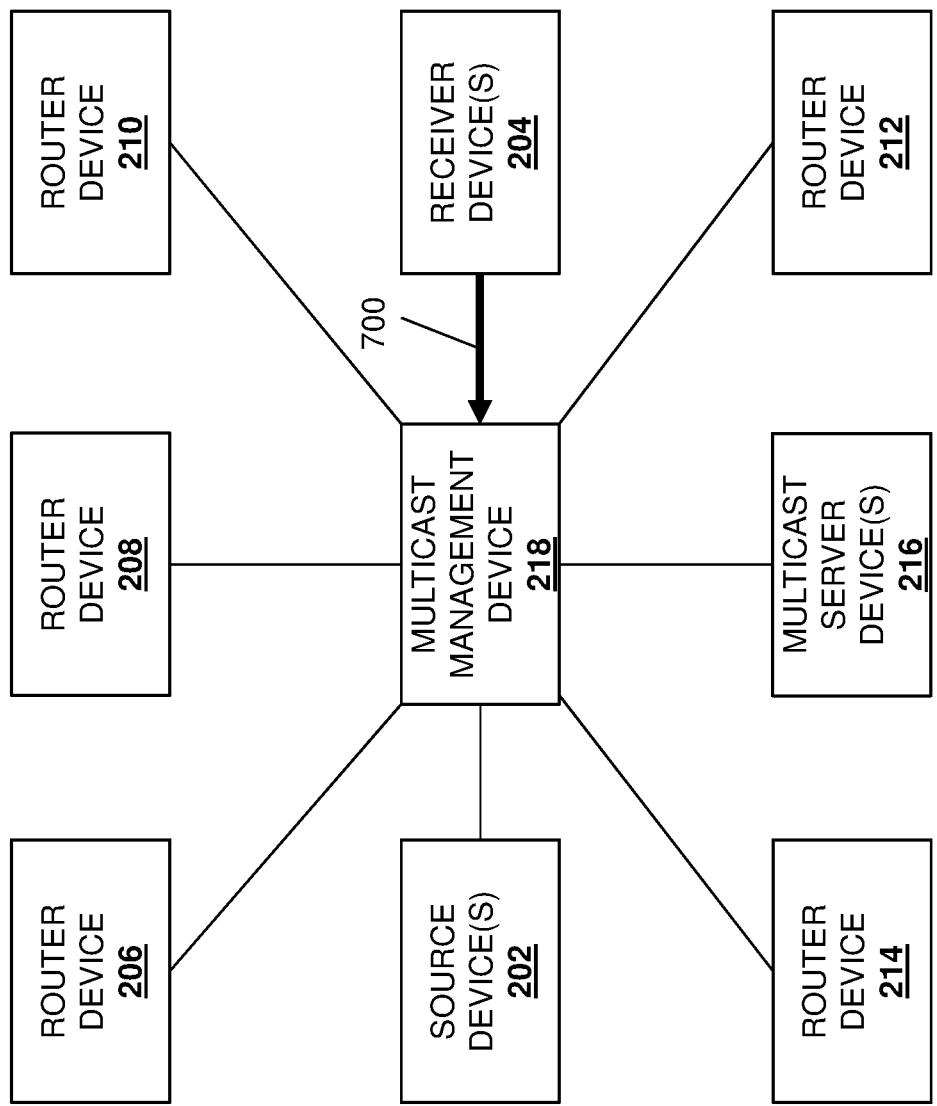
FIG. 7A is schematic view illustrating an embodiment of a receiver device requesting to join a data stream in the multicasting system of FIGS. 2A and 2B.

At block 602, the receiver device 204 may identify the data stream generated, provided, and/or otherwise enabled by the source device 202 and, in response to any of a variety of user and/or automated instructions, may generate a request to join that data stream, and send that request to a management subsystem. For example, FIG. 7A illustrates the receiver device sending a request 700 the multicast management device 218, and one of skill in the art in possession of the present disclosure will recognize that the request 700 may be sent directly to the multicast management device 218 as illustrated in FIG. 7A, or through one or more devices (e.g., the router devices or other networking devices discussed above) that provide the management plane discussed above. In an embodiment, the request 700 to join the data stream may include authorization credentials, and may identify the data stream (which may include any stored or "live"/real-time content), the source device, the receiver device, and/or any other information that would be apparent to one of skill in the art in possession of the present disclosure. As discussed below, any receiver device in the multicast system 200 may identify the data stream generated, provided, and/or otherwise enabled by the source device 202, and provide a request to join that data stream in a manner that is similar to that described above.

The method 600 then proceeds to block 604 where the management subsystem receives the request and performs an admission control operation. In an embodiment, at block 604, the multicast management engine 304 in the multicast management device 218/300 may receive the request 700 from the receiver device 204 via its communication system 308. In some embodiments, the multicast management engine 304 in the multicast management device 218/300 may perform admission control operations using authorization credentials included in the request 700 to determine whether the receiver device 204 is authorized to receive the data stream 800. However, one of skill in the art in possession of the present disclosure will recognize that any of a variety of admission control operations may be performed by the multicast management device 218 at block 604 while remaining within the scope of the present disclosure.

The method 600 then proceeds to block 606 where the management subsystem configures the router device. In an embodiment, the multicast management engine 304 may use the information included in the request, information included in the multicast management database 306 (e.g., network information that describes the configuration of the multicast system 200, etc.), and/or any other information that would be apparent to one of skill in the art in possession of the present disclosure to identify a "split point" router device in the multicast system 200 that should be configured according to the teachings of the present disclosure. For example, with reference to FIG. 2A, multicast management engine 304 may identify the router device 210 as a split point router device at block 606 based on its position in the multicast system 200 relative to the multicast server device 216 and the receiver device 204.

As discussed herein, data streams in the multicast system 200 are transmitted by source devices as unicast communications directed to a multicast server device, and that multicast server device may be the only multicast server device in the multicast system 200, or may be selected (e.g., may the multicast management device 218) from a plurality of multicast server device available in the multicast system 200. With reference to the configuration of the multicast system 200 illustrated in FIG. 2A, one of skill in the art in possession of the present disclosure will recognize that positioning of the router device 210 in the multicast system 200 illustrated in FIG. 2A allows a unicast communication directed by the source device 202 to the multicast server device 216 to have the router device 210 be the last device in the multicast system 200 that handles that unicast communication after it travels through the multicast system 200 and before it is provided to the multicast server device 216. Furthermore, the positioning of the router device 210 in the multicast system 200 also allows the router device 210 to efficiently forward communications to the receiver device 204. In an embodiment, the multicast management engine 304 in the multicast management device 218/300 may be configured to select the router device 210 as a "split point" router device using a variety of logic, algorithms, and/or other instructions that would be apparent to one of skill in the art in possession of the present disclosure. Furthermore, as discussed below (e.g., with reference to FIGS. 9A-C and/or 10A-D), "split point" router devices may be selected based on other considerations, and one of skill in the art in possession of the present disclosure will recognize that the examples of "split point" router device selection are not an exhaustive list of selection criteria, with a variety of different considerations other than those discussed in detail herein falling within the scope of the present disclosure as well.

Figure 7B:
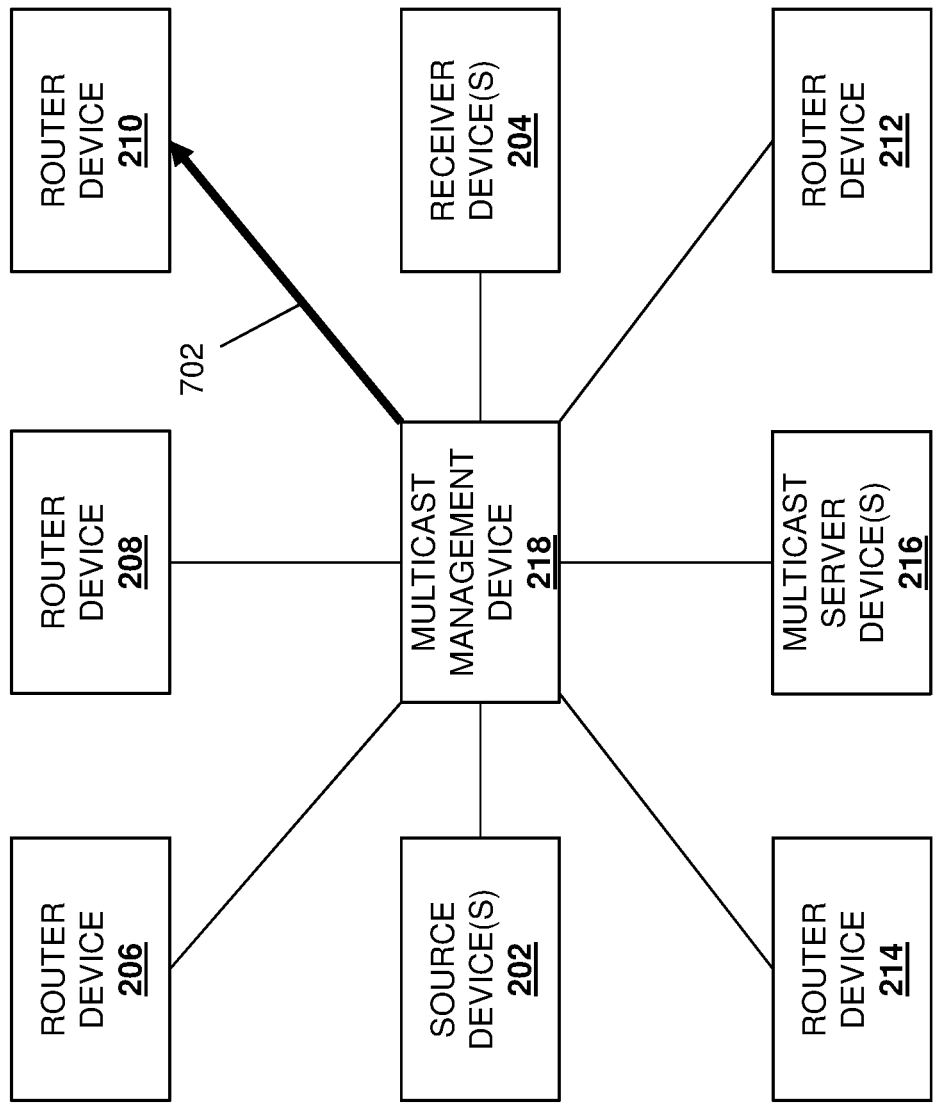
FIG. 7B is schematic view illustrating an embodiment of a management device configuring a router device to provide a data stream to a receiver device in the multicasting system of FIGS. 2A and 2B.

With reference to FIG. 7B, in an embodiment of at block 606, the multicast management engine 304 in the multicast management device 218/300 may provide a configuration 702 to the router device 210. As such, at block 606, the router engine 504 in the router device 210/500 may be configured via its communication system 508 and based on the configuration 702, and/or the router engine 504 in the router device 210/500 may receive the configuration 702 through its configuration system 508 and store the configuration in the router database 506. As discussed in further detail below, the configuration 702 may be any information, instructions, and/or other configuration details that configure the router device 210 to replicate the data stream (received from the source device 202 as the unicast communication directed to multicast server device 216) to provide a replicated data stream, and transmit that replicated data stream as a unicast communication to the receiver device 204.

In a specific example, the portion of the configuration provided by the multicast management device 218 that configures the router device 210 to transmit the replicated data steam to the receiver device 204 may include information, instructions, and/or other configuration details that configure the router device 210 to provide a header in that replicated data stream that "replaces" the source device 202 with the multicast server device 216 as the source of the data stream (e.g., provide a multicast server device IP address of the multicast server device 216 as the source of the replicated data stream when the original data stream received from the source device 202 included a source device IP address of the source device 202 as its source), and provide the header in that replicated data stream that "replaces" the multicast server device 216 with the receiver device 204 as the destination of the data stream (e.g., provide a receiver device IP address of the receiver device 204 as the destination of the replicated data stream when the original data stream received from the source device 202 included a multicast server device IP address of the multicast server device 216 as its destination). However, one of skill in the art in possession of the present disclosure will recognize that other configuration details may be provided to configure the router device 210 with the functionality discussed below while remaining within the scope of the present disclosure as well.

Figure 8A:
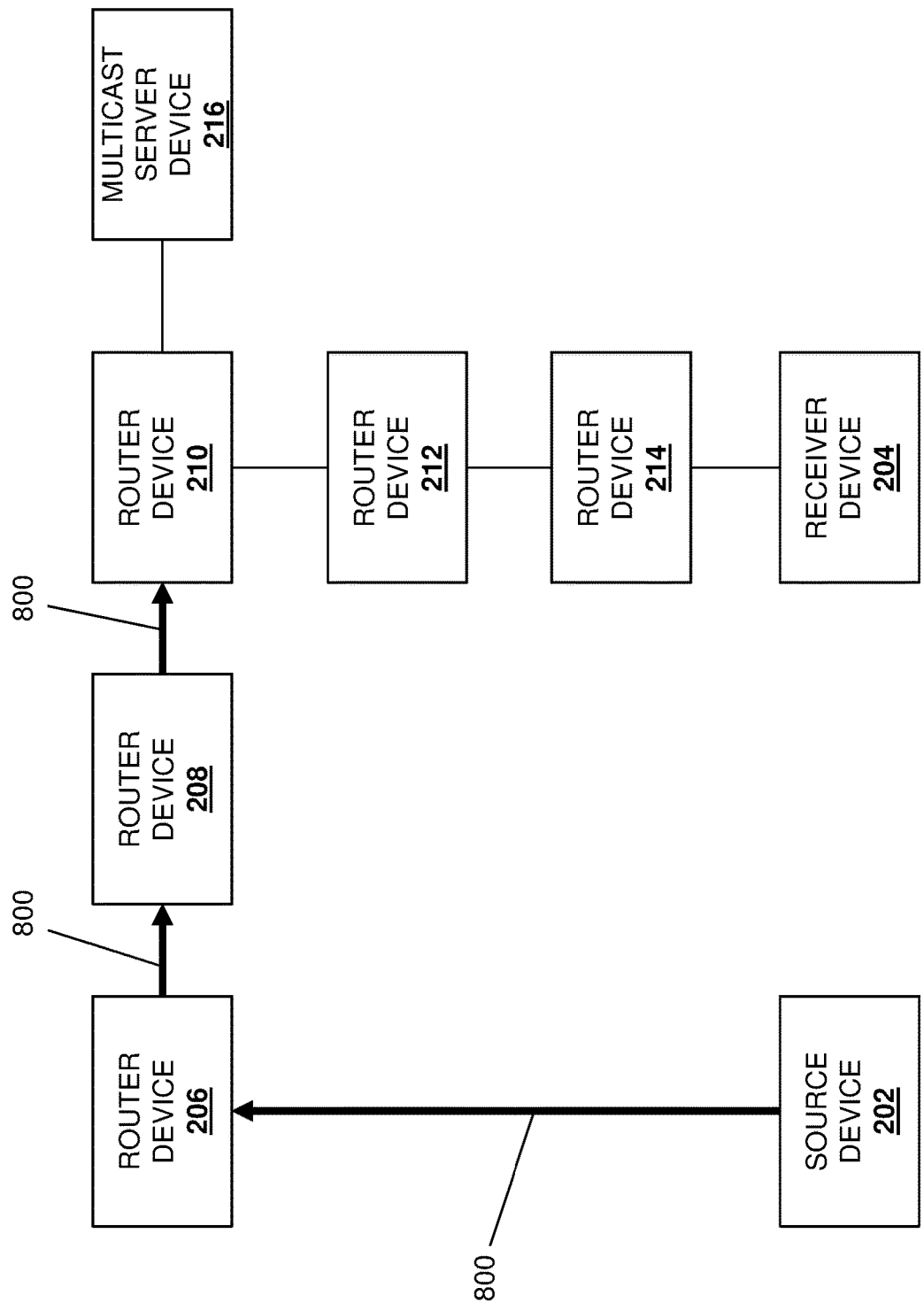
FIG. 8A is schematic view illustrating an embodiment of a source device providing a data stream as a unicast communication to a router device in the multicasting system of FIGS. 2A and 2B.

The method 600 then proceeds to block 608 where a source device transmits the data stream as a unicast communication that is directed through the router device to a server subsystem. In an embodiment, at block 608, the source device 202 transmits a data stream as a unicast communication that is directed through the router device 210 to the multicast server device 216. FIG. 8A illustrates a data stream 800 provided by the source device 202 through the router device 206 and the router device 208 to the router device 210. As discussed above, packets in the data stream 800 may be provided with headers that include the source device 202 as the source of the data stream 800 (e.g., a source device IP address of the source device 202 as its source), and the multicast server device 216 as the destination of the data stream (e.g., a multicast server device IP address of the multicast server device 216 as its destination). As such, the data stream 800 may be provided as a unicast communication where IP packets that make up the data stream 800 are provided from the source device 202 to a single recipient in the multicast system 200, i.e., the multicast server device 216 in this example.

Figure 8B:
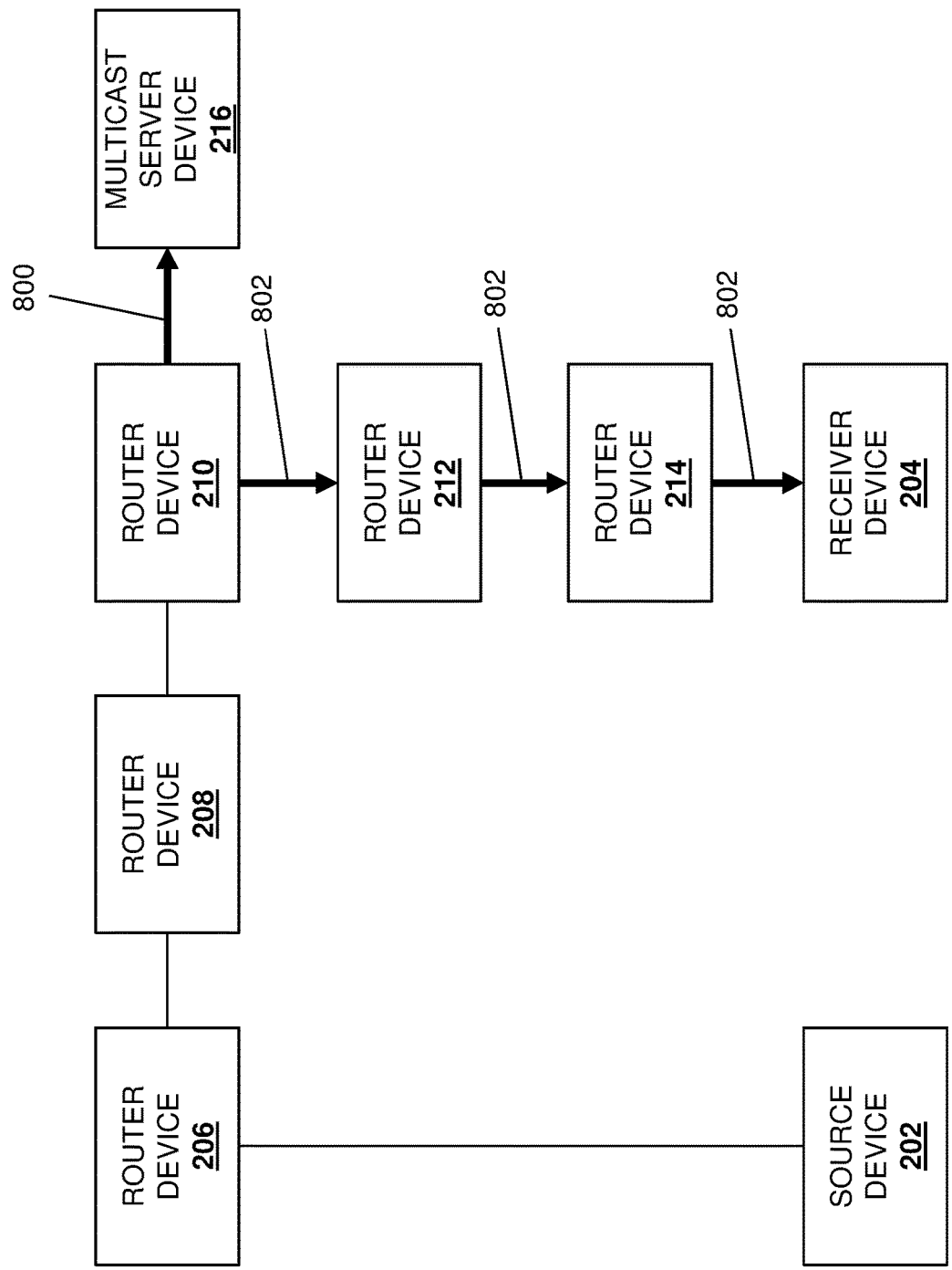
FIG. 8B is schematic view illustrating an embodiment of a router device providing the data stream as a unicast communication to a server device in the multicasting system of FIGS. 2A and 2B, and replicating the data stream to provide a replicated data stream that is transmitted to a receiver device in the multicasting system of FIGS. 2A and 2B.

The method 600 then proceeds to block 610 where the router device replicates the data stream received as a unicast communication and directed to the server device and transmits a replicated data stream as a unicast communication to the receiver device. In an embodiment, at block 610, the router engine 504 in the router device 210 may operate to replicate the data stream 800 received from the source device 202 at block 608 to provide a replicated data stream 802. As illustrated in FIG. 8B, the router engine 504 in the router device 210 may forward the data stream 800 to the multicast server device 216 (e.g., based on the headers that include the multicast server device 216 as the destination of the data stream (e.g., a multicast server device IP address of the multicast server device 216 as its destination)). In addition, as discussed above, the router device 210/500 was configured by the multicast management device 218 at block 606 to replicate the data stream 800 to provide a replicated data stream 802, and provide a header in that replicated data stream 802 that "replaces" the source device 202 with the multicast server device 216 as the source of the data stream (e.g., provide a multicast server device IP address of the multicast server device 216 as the source of the replicated data stream 802 when the data stream 800 included a source device IP address of the source device 202 as its source), and provide the header in that replicated data stream 802 that "replaces" the multicast server device 216 with the receiver device 204 as the destination of the data stream (e.g., provide a receiver device IP address of the receiver device 204 as the destination of the replicated data stream 802 when the data stream 800 included a multicast server device IP address of the multicast server device 216 as its destination). Thus, as illustrated in FIG. 8B, the router engine 504 in the router device 210 may transmit the replicated data stream 802 to the receiver device 204 via the router device 212 and the router device 214 (e.g., based on the headers that include the receiver device 204 as the destination of the data stream (e.g., a receiver device IP address of the receiver device 216 as its destination)). As such, the replicated data stream 802 may be provided as a unicast communication where IP packets that make up the data stream 802 are provided from the router device 210 to a single recipient in the multicast system 200, i.e., the receiver device 204 in this example.

Therefore, a data stream from the source device 202 may be transmitted as a unicast communication directed to the multicast server device 216, and will be replicated by the router device 210 (the "split point" router device for the multicast server device 216 and the receiver device 204) that receives that data stream and forwards it to the multicast server device 216, with the router device 210 transmitting the replicated data stream as a unicast communication directed to the receiver device 204. One of skill in the art in possession of the present disclosure will recognize that embodiments of multicasting data streams in the multicast system 200 via the plurality of router devices substantially reduces the amount of state that must be maintained by those router devices, as a majority of the router devices that handle the unicast communications that provide the data stream simply forward that data stream based on destination identifiers in the packet headers (and do not maintain state information on the multicast data stream), with a single "split point" router device configured to replicate the original data stream and provide for the forwarding of that replicated data stream to the receiver device 204.

Figure 9A:
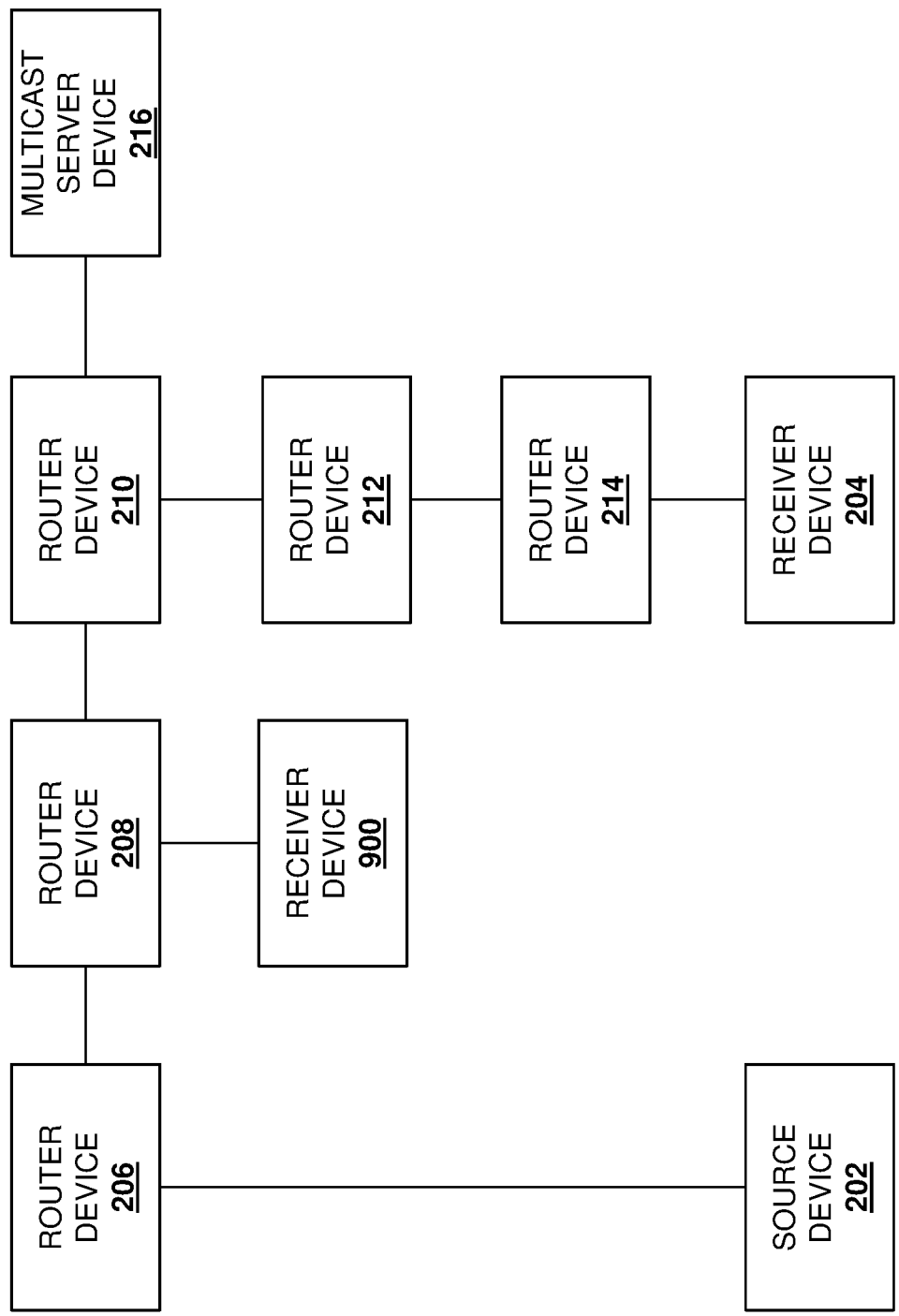
FIG. 9A is schematic view illustrating an embodiment of a receiver device added to the multicasting system of FIGS. 8A and 8B.
Figure 9B:
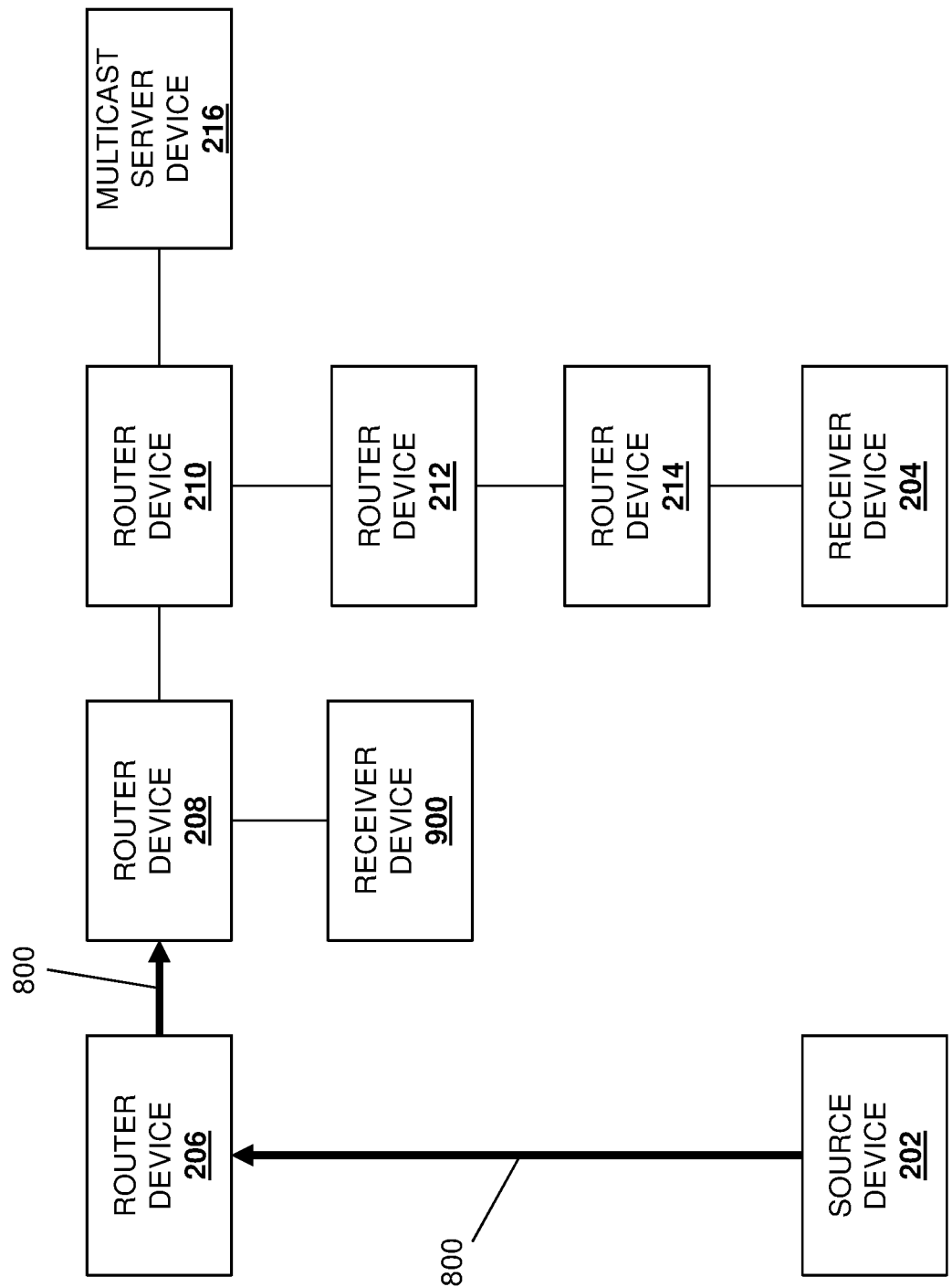
FIG. 9B is schematic view illustrating an embodiment of a source device providing a data stream as a unicast communication to a router device in the multicasting system of FIG. 9A.
Figure 9C:
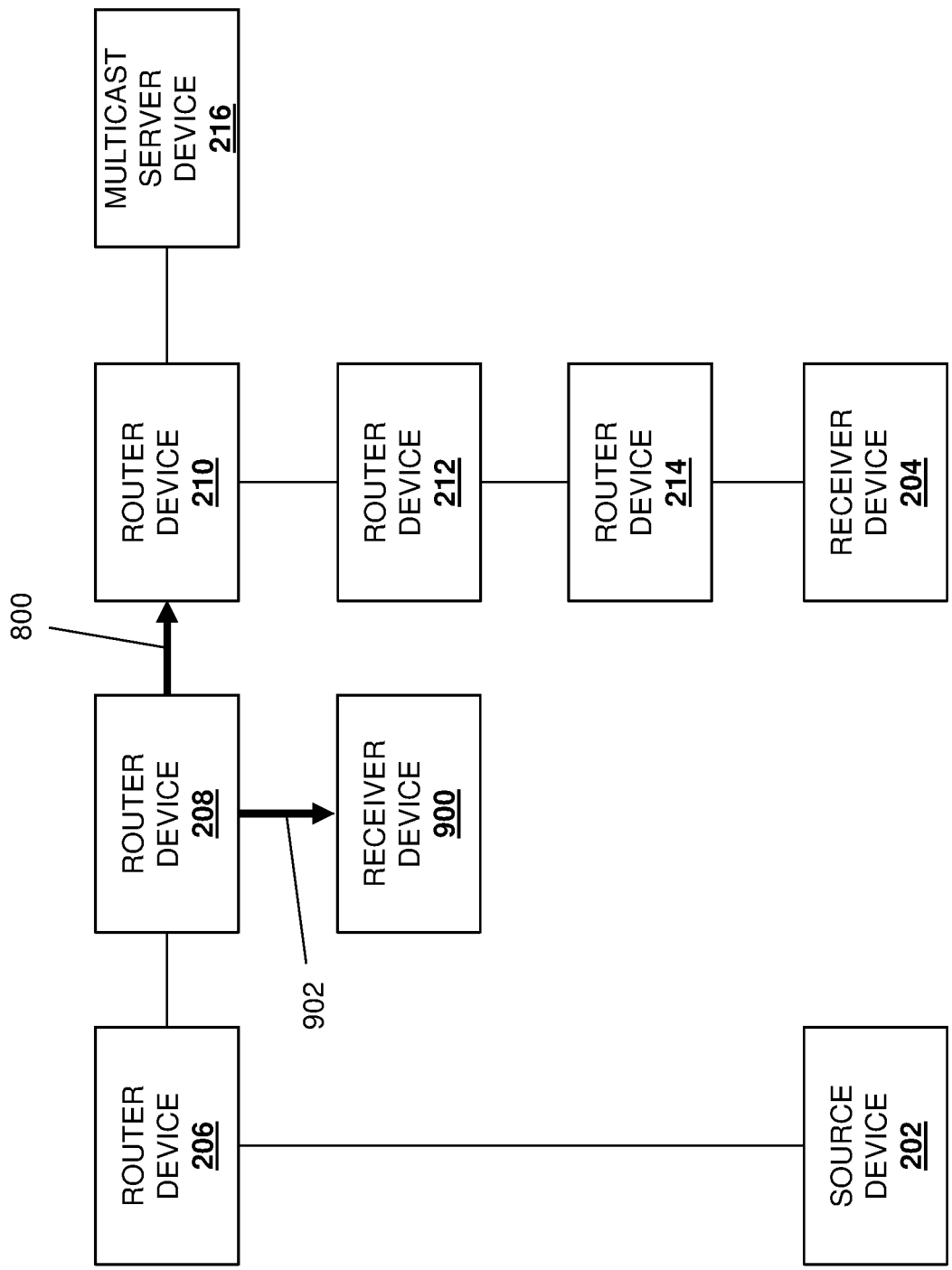
FIG. 9C is schematic view illustrating an embodiment of a router device providing the data stream as a unicast communication to another router device in the multicasting system of FIG. 9A, and replicating the data stream to provide a replicated data stream that is transmitted to a receiver device in the multicasting system of FIG. 9A.

With reference to FIGS. 9A-9C, an embodiment of blocks 602-610 the method 600 will now be described to illustrate the addition of a receiver device to the multicasting system 200 described above with reference to FIGS. 8A and 8B. Referring first to FIG. 9A, a receiver device 900 may be coupled to the router device 208 (e.g., via the communication system 508 on the router device 208). At block 602, the receiver device 900 may generate a request to join the data stream 800 provided by the source device 202, and transmit that request to the multicast management device 218 in substantially the same manner as discussed above with reference to FIG. 7A for the receiver device 204. Furthermore, at blocks 604 and 606 the multicast management device 218 may receive the request, perform admission control operations, and configure the router device 208 in substantially the same manner as discussed above with reference to FIG. 7B for the router device 210. One of skill in the art in possession of the present disclosure will recognize that the router device 208 may be identified as a "split point" router device for the multicast server device 216 and the receiver device 900 using the criteria discussed above, and/or any other criteria that would be apparent to one of skill in the art in possession of the present disclosure.

With reference to FIG. 9B, at block 608, the source device 202 transmits the data stream 800 as a unicast communication that is directed through the router device 208 to the multicast server device 216. FIG. 9B illustrates the data stream 800 provided by the source device 202 through the router device 206 to the router device 208 and, as discussed above, packets in the data stream 800 may be provided with headers that include the source device 202 as the source of the data stream 800 (e.g., a source device IP address of the source device 202 as its source), and the multicast server device 216 as the destination of the data stream (e.g., a multicast server device IP address of the multicast server device 216 as its destination). As such, the data stream 800 may be provided as a unicast communication where IP packets that make up the data stream 800 are provided from the source device 202 to a single recipient in the multicast system 200, i.e., the multicast server device 216 in this example.

With reference to FIG. 9C, at block 610, the router engine 504 in the router device 208 may operate to replicate the data stream 800 received from the source device 202 at block 608 to provide a replicated data stream 902. As illustrated in FIG. 9C, the router engine 504 in the router device 208 may forward the data stream 800 to the router device 210, which may then operate in substantially the same manner as discussed above with reference to FIG. 8B (e.g., forwarding the data stream 800 to the multicast server device 216, replicating the data stream 800 to provide the replicated data stream 802, and transmitting the replicated data stream 802 to the receiver device 204.) In addition, the router engine 504 in the router device 208 may operate to replicate the data stream 800 received from the source device 202 at block 608 to provide the replicated data stream 902. As discussed above, the router device 208/500 was configured by the multicast management device 218 according to block 606 to replicate the data stream 800 to provide a replicated data stream 902, and provide a header in that replicated data stream 902 that "replaces" the source device 202 with the multicast server device 216 as the source of the data stream (e.g., provide a multicast server device IP address of the multicast server device 216 as the source of the replicated data stream 902 when the data stream 800 included a source device IP address of the source device 202 as its source), and provide the header in that replicated data stream 900 that "replaces" the multicast server device 216 with the receiver device 900 as the destination of the data stream (e.g., provide a receiver device IP address of the receiver device 900 as the destination of the replicated data stream 902 when the data stream 800 included a multicast server device IP address of the multicast server device 216 as its destination). Thus, as illustrated in FIG. 9C, the router engine 504 in the router device 208/500 may transmit the replicated data stream 902 to the receiver device 900. As such, the replicated data stream 902 may be provided as a unicast communication where IP packets that make up the data stream 902 are provided from the router device 208 to a single recipient in the multicast system 200, i.e., the receiver device 900 in this example.

Figure 10A:
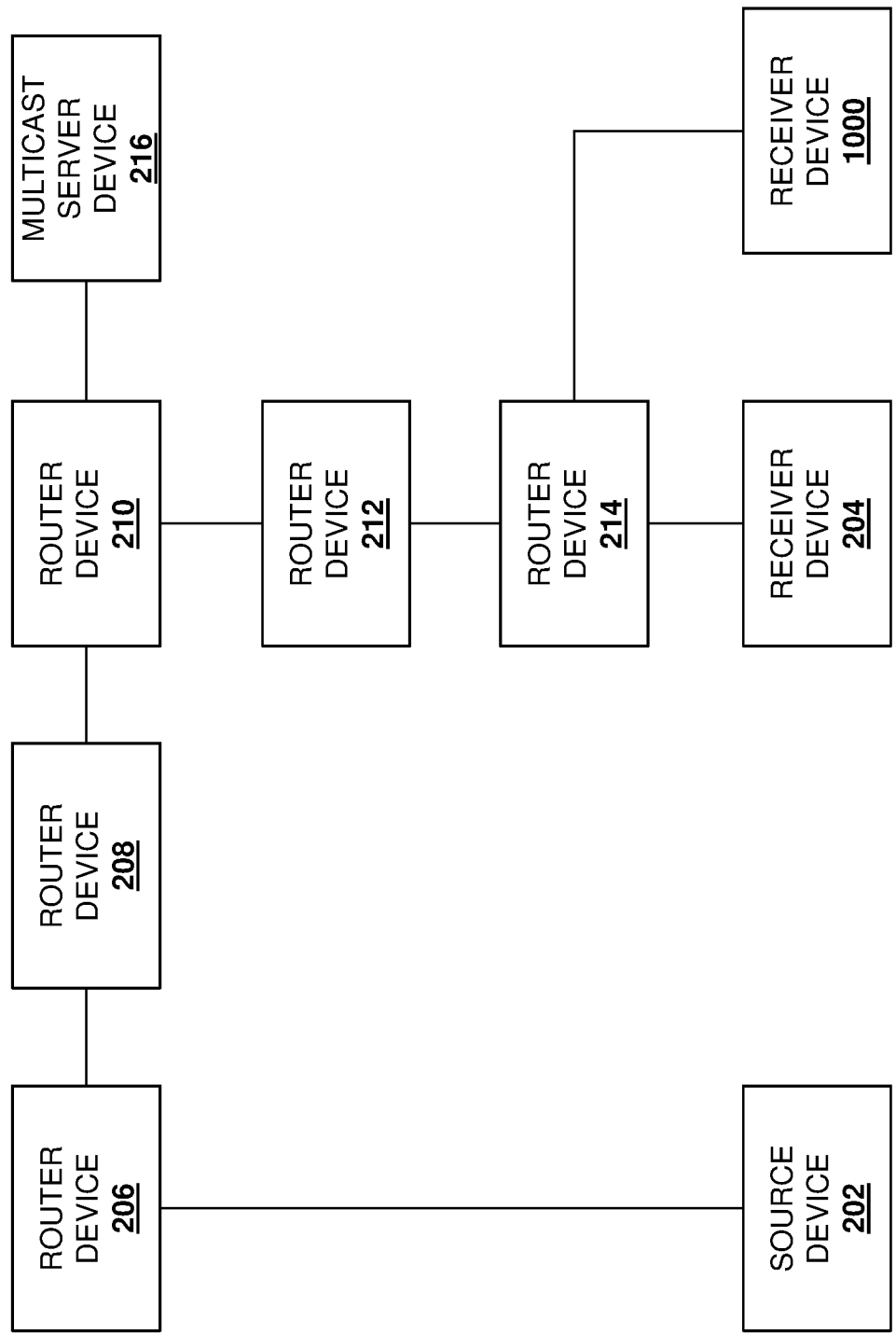
FIG. 10A is schematic view illustrating an embodiment of a receiver device added to the multicasting system of FIGS. 8A and 8B.

With reference to FIGS. 10A-D, another embodiment of blocks 602-610 the method 600 will now be provided based on the addition of a destination device to the multicasting system 200 described above with reference to FIGS. 8A and 8B. Referring first to FIG. 10A, a receiver device 1000 may be coupled to the router device 214 (e.g., via the communication system 508 on the router device 214). At block 602, the receiver device 1000 may generate a request to join the data stream 800 provided by the source device 202, and transmit that request to the multicast management device 218 in substantially the same manner as discussed above with reference to FIG. 7A for the receiver device 204. Furthermore, at blocks 604 and 606 the multicast management device 218 may receive the request, perform admission control operations, and configure the router device 214 in substantially the same manner as discussed above with reference to FIG. 7B for the router device 210. One of skill in the art in possession of the present disclosure will recognize that the router device 214 may be identified as a "split point" router device for the multicast server device 216 and the receiver device 1000 using the criteria discussed above, and/or any other criteria that would be apparent to one of skill in the art in possession of the present disclosure.

Figure 10B:
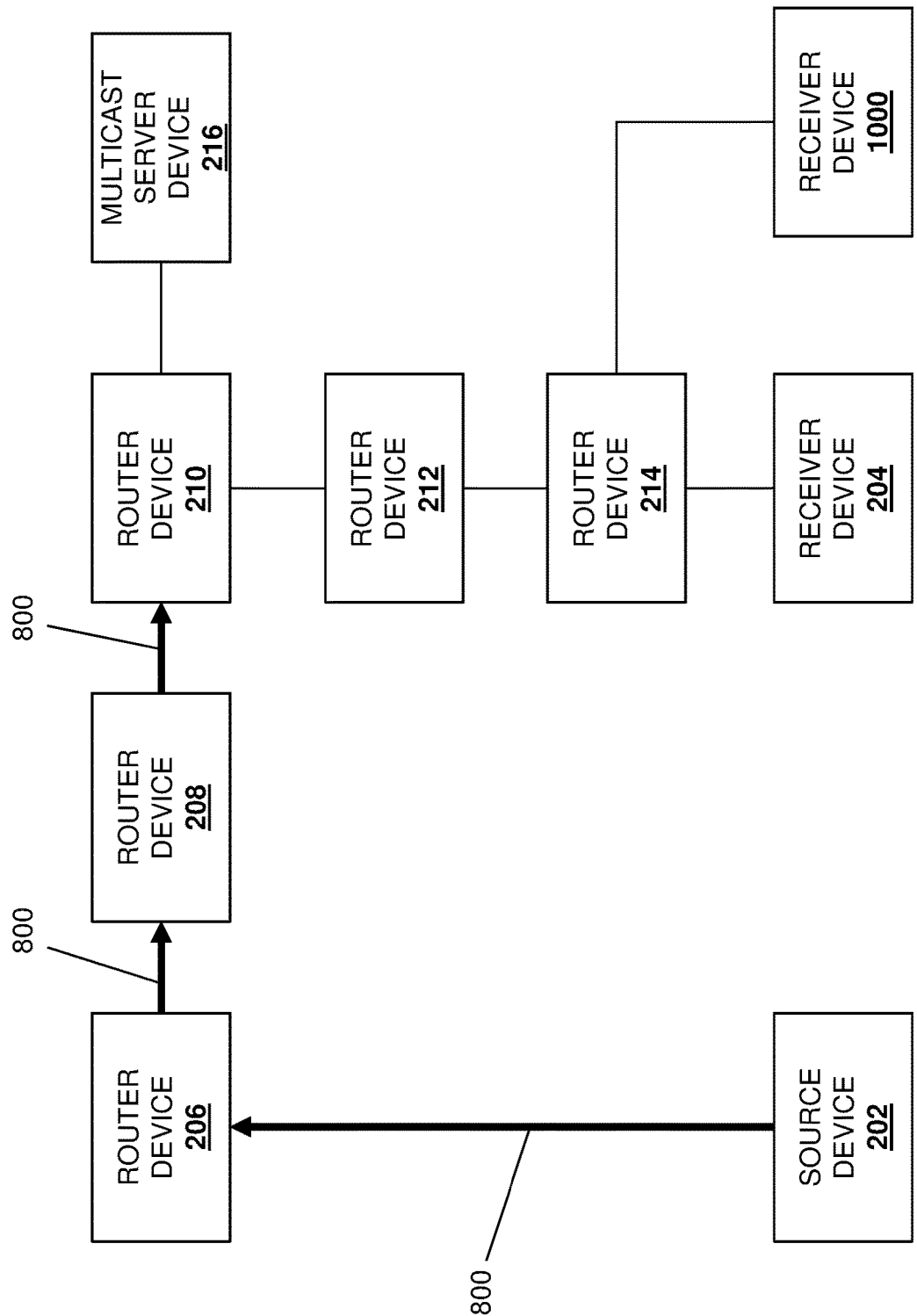
FIG. 10B is schematic view illustrating an embodiment of a source device providing a data stream as a unicast communication to a router device in the multicasting system of FIG. 10A.

With reference to FIG. 10B, at block 608, the source device 202 transmits the data stream 800 as a unicast communication that is directed through the router device 210 to the multicast server device 216. FIG. 10B illustrates the data stream 800 is provided by the source device 202 through the router devices 206 and 208 to the router device 210 and, as discussed above, packets in the data stream 800 may be provided with headers that include the source device 202 as the source of the data stream 800 (e.g., a source device IP address of the source device 202 as its source), and the multicast server device 216 as the destination of the data stream (e.g., a multicast server device IP address of the multicast server device 216 as its destination). As such, the data stream 800 may be provided as a unicast communication where IP packets that make up the data stream 800 are provided from the source device 202 to a single recipient in the multicast system 200, i.e., the multicast server device 216 in this example.

Figure 10C:
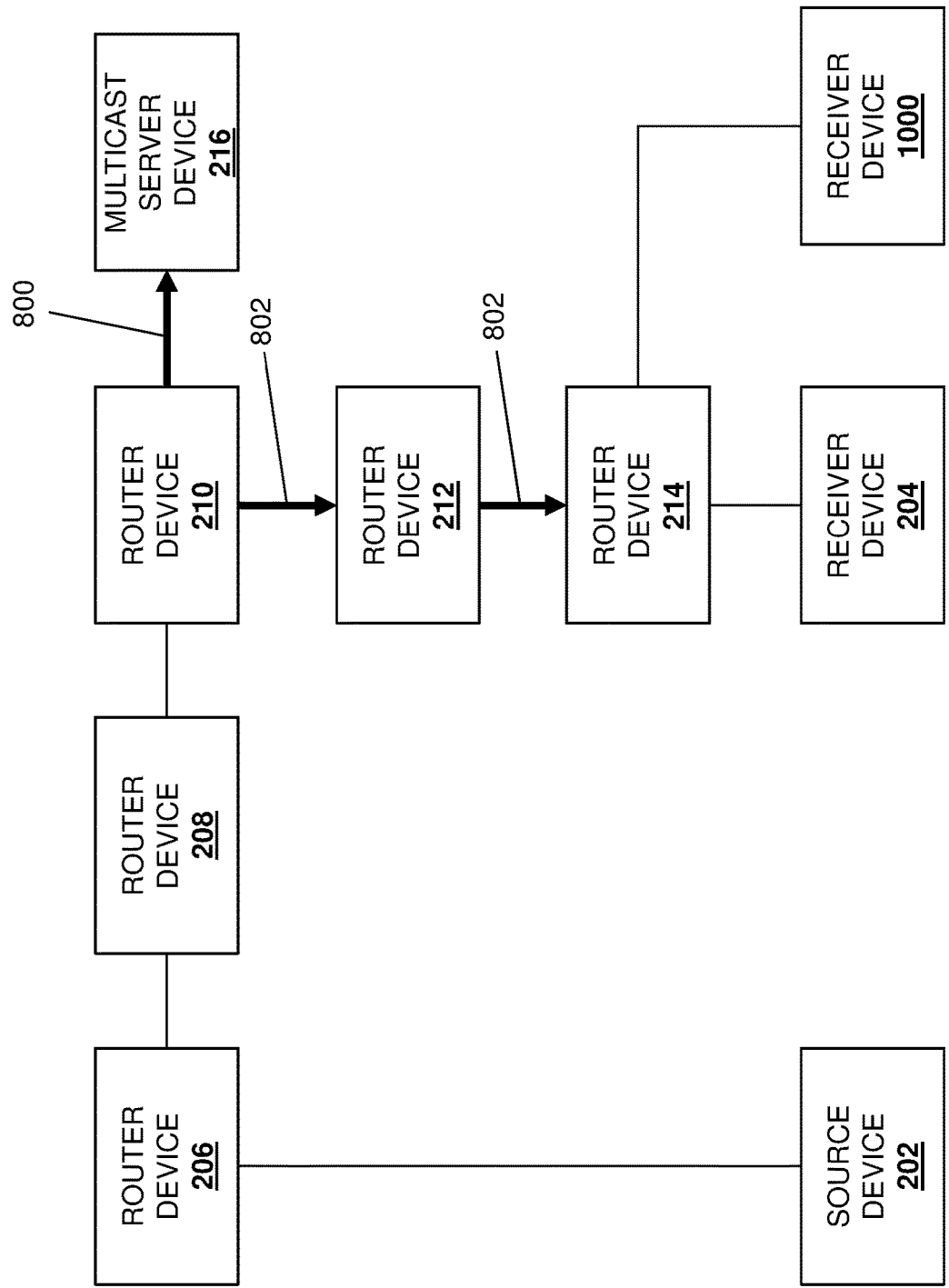
FIG. 10C is schematic view illustrating an embodiment of a router device providing the data stream as a unicast communication to another router device in the multicasting system of FIG. 9A, and replicating the data stream to provide a replicated data stream that is transmitted to another router device in the multicasting system of FIG. 10A.
Figure 10D:
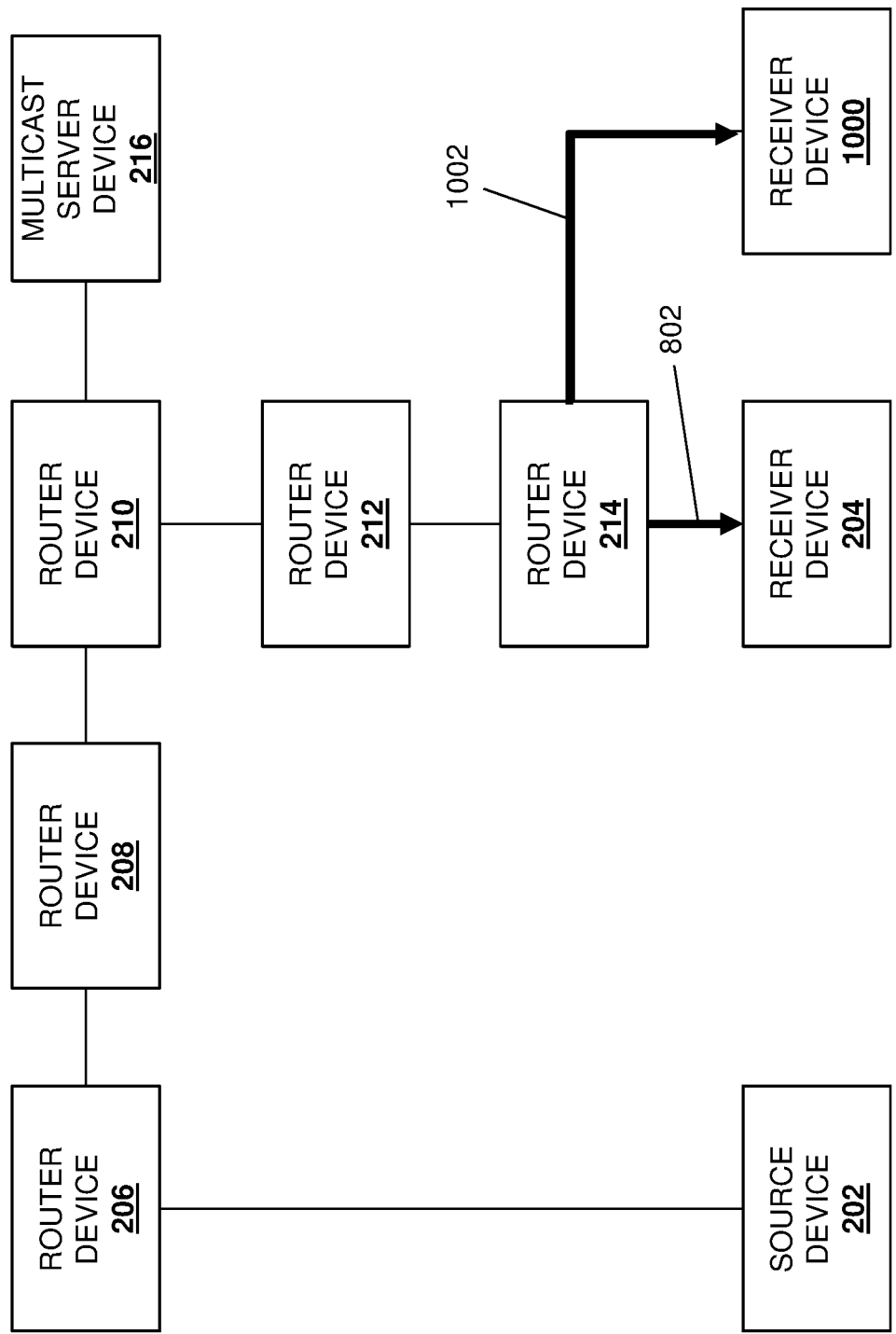
FIG. 10D is schematic view illustrating an embodiment of a router device providing the replicated data stream to a receiver device in the multicasting system of FIG. 10A, and replicating the replicated unicast data stream to provide another replicated data stream that is transmitted to another receiver device in the multicasting system of FIG. 10A.

With reference to FIG. 10C, at block 610, the router engine 504 in the router device 210 may operate to replicate the data stream 800 received from the source device 202 at block 608 to provide the replicated data stream 802, as discussed above. As illustrated in FIG. 10C, the router engine 504 in the router device 210 may operate in substantially the same manner as discussed above with reference to FIG. 8B (e.g., forwarding the data stream 800 to the multicast server device 216, replicating the data stream 800 to provide the replicated data stream 802, and transmitting the replicated data stream 802 to the router device 214.) As illustrated in FIG. 10D, the router engine 504 in the router device 214 may operate in substantially the same manner as discussed above with reference to FIG. 8B (e.g., forwarding the replicated data stream 802 to the receiver device 204.) In addition, the router engine 504 in the router device 214 may operate to replicate the replicated data stream 802 received from the router device 210 at block 608 to provide another replicated data stream 1002. As discussed above, the router device 214/500 was configured by the multicast management device 218 according to block 606 to replicate the replicated data stream 802 to provide another replicated data stream 1002, and provide a header in that replicated data stream 1002 that "replaces" the multicast server device 216 with the receiver device 1000 as the destination of the data stream (e.g., provide a receiver device IP address of the receiver device 1000 as the destination of the replicated data stream 1002 when the replicated data stream 802 included a receiver device IP address of the receiver device 204 as its destination). Thus, as illustrated in FIG. 10D, the router engine 504 in the router device 214/500 may transmit the replicated data stream 1002 to the receiver device 1000. As such, the replicated data stream 1002 may be provided as a unicast communication where IP packets that make up the data stream 1002 are provided from the router device 214 to a single recipient in the multicast system 200, i.e., the receiver device 1000 in this example.

Figure 11A:
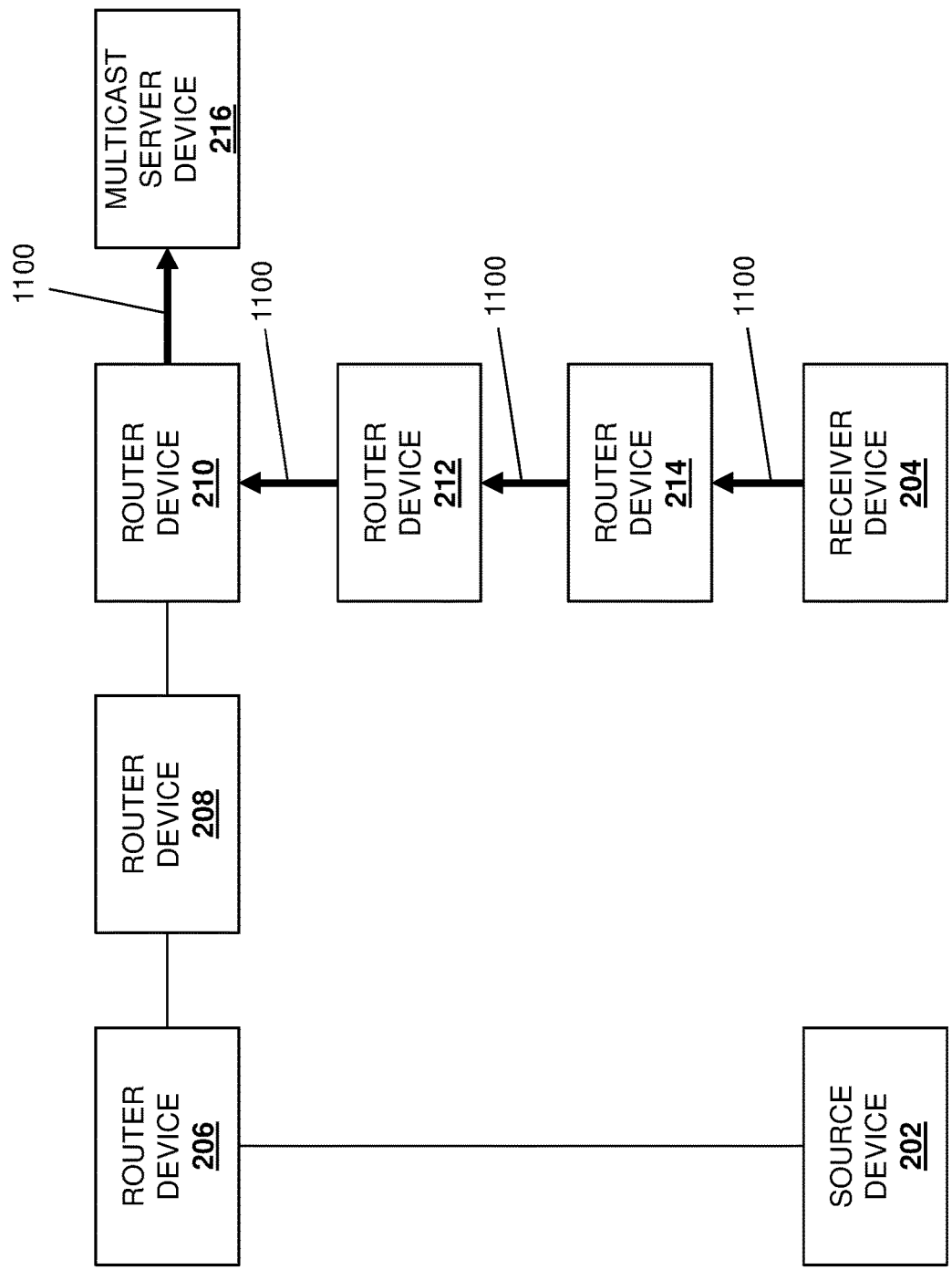
FIG. 11A is a schematic view illustrating an embodiment of a receiver device in the multicast system of FIGS. 8A and 8B providing a data stream communication to a server device in the multicasting system of FIGS. 8A and 8B.
Figure 11B:
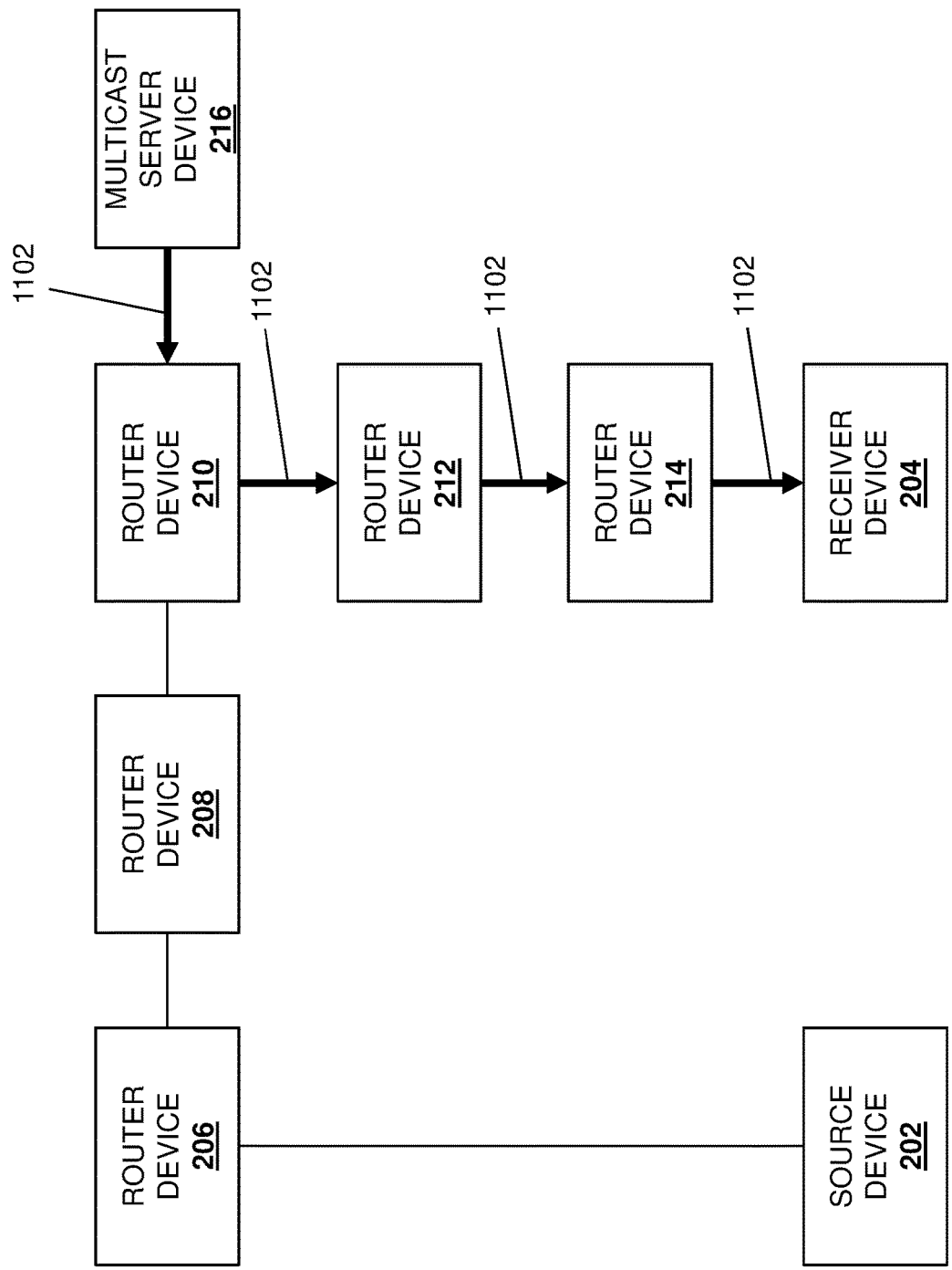
FIG. 11B is a schematic view illustrating an embodiment of a server device in the multicast system of FIGS. 8A and 8B providing a data stream communication to a destination device in the multicasting system of FIGS. 8A and 8B.
Figure 11C:
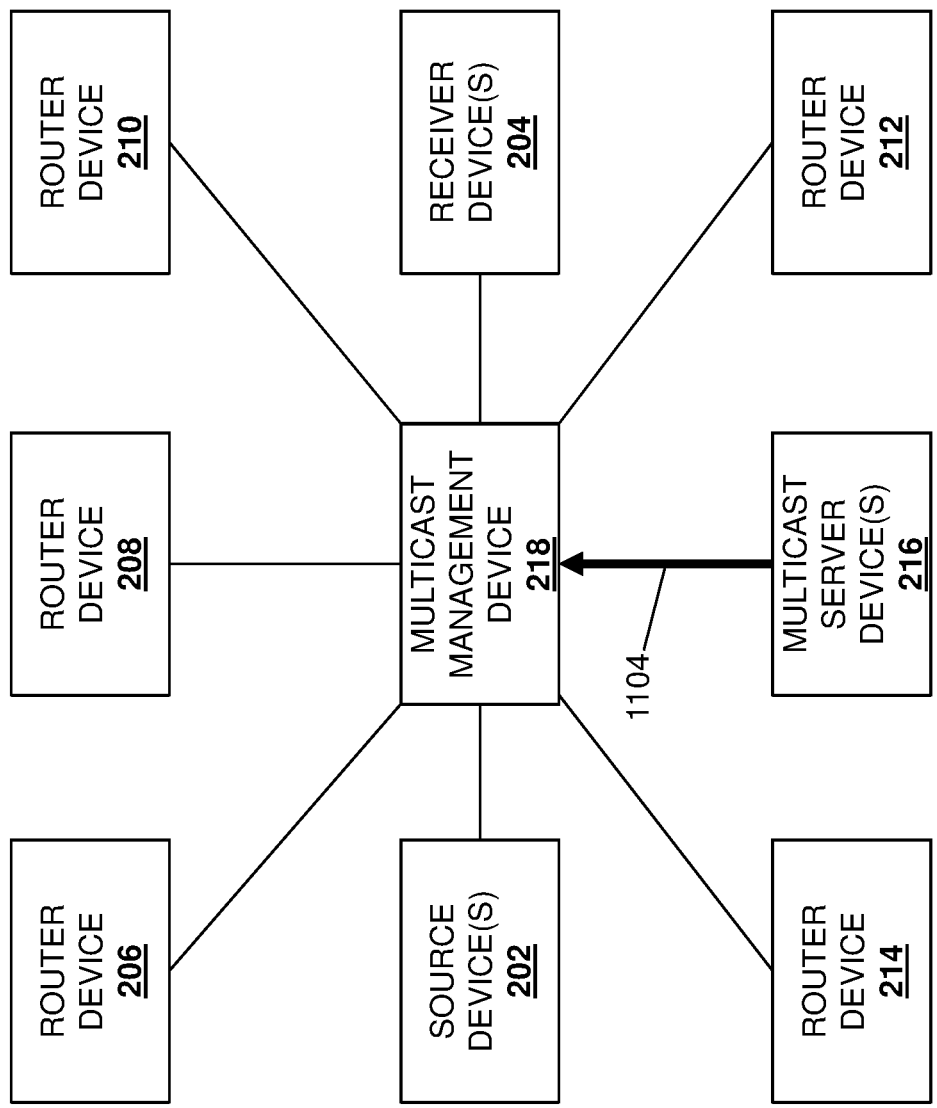
FIG. 11C is a schematic view illustrating an embodiment of a server device in the multicast system of FIGS. 8A and 8B providing a data stream communication to a management device in the multicasting system of FIGS. 8A and 8B.

The method 600 then proceeds to block 612 where the server subsystem and/or the management subsystem manage the receiver device and the data stream. In an embodiment, at block 612, the multicast server engine 404 in the multicast server device 216/400 may operate to manage the receiver device(s), as well as the data stream(s) provided by the source device 202 and delivered to the receiver device(s). Furthermore, with reference to the data stream 800 provided by the source device 202 and the replicated data stream 802 replicated from that data stream 800 and provided to the receiver device 204, the receiver device 204 may communicate with the multicast server device 216 to identify packet losses in the replicated data stream 802. FIG. 11A illustrates the receiver device 204 having identified a packet loss in the replicated data stream 802 and, in response, sending a packet loss communication 1100 through the router devices 214, 212, and 210 to the multicast server device 216. As illustrated in FIG. 11B, when the multicast server engine 404 in the multicast server device 216/400 receives the packet loss communication 1100, it may provide a lost packet communication 1102, which may include any portion of the replicated data stream 802 that was identified in the packet loss communication 1100, through the router devices 210, 212, and 214 to the receiver device 204. As such, the data plane in the multicast system 200 may provide for data stream packet loss reconciliation In another example, with reference to the data stream 800 provided by the source device 202 and the replicated data stream 802 replicated from that data stream 800 and provided to the receiver device 204, the multicast server device 216 may monitor the receiver device 204 to determine whether the receiver device 204 becomes inactive. In a specific example, the receiver device 204 may be configured to periodically send an acknowledgement ("ACK") and/or a negative acknowledgement ("NACK") to the multicast server device 216, and the multicast server engine 404 in the multicast server device 216/400 may be configured to monitor for the receipt of those ACKs and/or NACKs and, if no ACK or NACK is received within some time period, identify an inactivity of the receiver device 204. As illustrated in FIG. 11C, in response to identifying an inactivity of the receiver device 204, the multicast server engine 404 in the multicast server device 216/400 may send a receiver inactivity communication 1104 to the multicast management device 300. In response to receiving a receiver inactivity communication 1104, the multicast management engine 304 in the multicast management device 218/300 may configure the router device 210 to stop replicating the data stream 800 to produce the replicated data stream 802 that is directed to the receiver device 204.

However, with reference to the example in FIGS. 10A-D along with the example of the router device 210 being configured to stop replicating the data stream 800 to produce the replicated data stream 802 that is directed to the receiver device 204, one of skill in the art in possession of the present disclosure will recognize that the router device 210 may continue to replicate the data stream 800 to provide the replicated data stream 802, and transmit the replicated data stream 802 to the router device 214 so that the router device 214 may replicate the replicated data stream 802 to provide the replicated data stream 1002 that is provided to the receiver device 1000 (or the router devices 210 and 214 may be reconfigured according to the teachings above to ensure that the receiver device 1000 continues to receive a replicated data stream.) Furthermore, one of skill in the art in possession of the present disclosure will recognize that the multicast server engine 404 in the multicast server device 216 may also monitor the liveliness of the data stream 800 provided by the source device 202 using, for example, ACKs and/or NACKs from the source device 202.

Thus, systems and methods have been described that provide for the multicasting of data streams via networking devices in a manner that substantially reduces the amount of state information that must be maintained by those networking devices. The multicasting of the present disclosure may be accomplished using a management subsystem that receives a request, which is transmitted by a receiver device that is coupled to a router device, and which identifies a data stream that is generated by a source device and transmitted by the source device as a unicast communication that is directed through the router device to a server subsystem. In response to receiving that request, the management subsystem configures the router device to replicate the data steam (which was received as the unicast communication that is directed to the server subsystem) to provide a replicated data stream, and transmit the replicated data stream as a unicast communication that is directed to the receiver device. The configuration of the router device by management subsystem enables the router device to change the source provided in the original data stream (i.e., the source device) to the server device in the replicated data stream, and change the destination provided in the original data stream (e.g., the server device) to the receiver device in the replicated data stream. Multicasting according to the teachings of the present disclosure may be applied to any network and router devices, and operates to reduce (and may substantially eliminate) the amount of state information that must be maintained by the router devices (e.g., there is nothing like a (*, G) state or (S, G) state that is provided in PIM) between the source device and the destination device, while providing separation of the data plane and the control plane, with data plane indicators selected by the multicast server subsystem that acts as the only entity in the multicast tree providing synchronization of the data plane and control plane. Furthermore, one of skill in the art in possession of the present disclosure will recognize that the multicast system of the present disclosure does not require the Internet Group Management Protocol (IGMP) to connect receiver devices to their router devices (e.g., Last Hop Router (LHR) devices).

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multicast system, comprising:
 a networking device;
 a server subsystem that is coupled to the networking device;
 a source device that is coupled to the networking device and that is configured to:
  generate a data stream; and
  transmit the data stream as a unicast communication that is directed through the networking device to the server subsystem, wherein the data stream transmitted by the source device identifies the source device as a source of the data stream and the server subsystem as a destination of the data stream;
 a receiver device that is coupled to the networking device and that is configured to:
  transmit a request to join the data stream; and
 a management subsystem that is coupled to the networking device and that is configured to:
  receive the request that was transmitted by the receiver device; and
  configure the networking device to:
   replicate the data stream received as the unicast communication that is directed to the server subsystem to provide a replicated data stream;
   identify the server subsystem as a source of the replicated data stream;
   identify the receiver device as a destination of the replicated data stream; and
   transmit the replicated data stream as a unicast communication that is directed to the receiver device.

2. The system of claim 1, wherein the server subsystem and the management subsystem are provided in the same device.

3. The system of claim 1, wherein the server subsystem is provided in a server device, and the management subsystem is provided in a management device that is separate from the server device.

4. The system of claim 1, wherein the server subsystem is configured to:
    detect an inactivity of the receiver device; and
    send a receiver inactivity communication to the management subsystem, wherein the management subsystem is configured to:
        receive the receiver inactivity communication; and
        configure, based on the receiver inactivity communication, the networking device to stop replicating the data stream and sending the replicated data stream to the receiver device.

5. The system of claim 1, wherein the receiver device is configured to:
    identify a packet loss in the replicated data stream; and
    send a packet loss communication through the networking device to the server subsystem, and wherein the server subsystem is configured to:
        receive the packet loss communication from the receiver device; and
        provide, based on the packet loss communication, a portion of the data stream to the receiver device.

6. An Information Handling System (IHS), comprising:
    a processing system; and
    a memory system that is coupled to the processing system and that includes instructions that, when executed by the processing system, cause the processing system to provide a management engine that is configured to:
        receive a request that was transmitted by a receiver device that is coupled to a networking device, wherein the request identifies a data stream that:
            is generated by a source device,
            identifies the source device as a source of the data stream;
            identifies a server subsystem as a destination of the data stream; and
            is transmitted as a unicast communication that is directed through the networking device to the server subsystem; and
        configure the networking device to:
            replicate the data stream received as the unicast communication that is directed to the server subsystem to provide a replicated data stream;
            identify the server subsystem as a source of the replicated data stream;
            identify the receiver device as a destination of the replicated data stream; and
            transmit the replicated data stream as a unicast communication that is directed to the receiver device.

7. The IHS of claim 6, further comprising:
    a management device chassis that houses the processing system and the memory system, wherein the server subsystem is housed in a server device chassis that is different than the management device chassis.

8. The IHS of claim 6, further comprising:
    a chassis that houses the processing system and the memory system, wherein the server subsystem is included in the chassis.

9. The IHS of claim 6, wherein the management engine is configured to:
    receive, from the server subsystem, a receiver inactivity communication that is generated based on an inactivity of the receiver device; and
    configure, based on the receiver inactivity communication, the networking device to stop replicating the data stream and sending the replicated data stream to the receiver device.

10. The IHS of claim 6, wherein the memory system includes instructions that, when executed by the processing system, cause the processing system to provide the server subsystem that is configured to:
    receive, from the receiver device, a packet loss communication that is generated based on an identification of a packet loss in the replicated data stream; and
    provide, based on the packet loss communication, a portion of the data stream to the receiver device.

11. The IHS of claim 6, wherein the memory system includes instructions that, when executed by the processing system, cause the processing system to provide the server subsystem that is configured to:
    monitor a liveliness of the data stream.

12. A method for multicasting, comprising:
    receiving, by a management subsystem, a request that was transmitted by a receiver device that is coupled to a networking device, wherein the request identifies a data stream that:
        is generated by a source device;
        identifies the source device as a source of the data stream;
        identifies a server subsystem as a destination of the data stream; and
        is transmitted as a unicast communication that is directed through the networking device to the server subsystem; and
    configuring, by the management subsystem, the networking device to:
        replicate the data stream received as the unicast communication that is directed to the server subsystem to provide a replicated data stream;
        identify the server subsystem as a source of the replicated data stream;
        identify the receiver device as a destination of the replicated data stream; and
        transmit the replicated data stream as a unicast communication that is directed to the receiver device.

13. The method of claim 12, wherein the management subsystem and the server subsystem are included in the same device.

14. The method of claim 12, wherein the management subsystem is included in a management device, and wherein the server subsystem is included in a server device that is different than the management device.

15. The method of claim 12, further comprising:
    receiving, by the management subsystem from the server subsystem, a receiver inactivity communication that is generated based on an inactivity of the receiver device; and
    configuring, by the management subsystem based on the receiver inactivity communication, the networking device to stop replicating the data stream and sending the replicated data stream to the receiver device.

16. The method of claim 12, further comprising:
    receiving, by the server subsystem from the receiver device, a packet loss communication that is generated based on an identification of a packet loss in the replicated data stream; and
    providing, by the server subsystem based on the packet loss communication, a portion of the data stream to the receiver device.

17. The method of claim 12, further comprising:
    monitoring, by the server subsystem, a liveliness of the data stream.

* * * * *